US012761844B2

(12) United States Patent
Shimada

(10) Patent No.: US 12,761,844 B2
(45) Date of Patent: Oct. 13, 2026

(54) PRINTING APPARATUS CAPABLE OF DISPLAYING ICON INDICATING CONNECTION STATE, METHOD OF CONTROLLING PRINTING APPARATUS, AND STORAGE MEDIUM

(71) Applicant: CANON KABUSHIKI KAISHA, Tokyo (JP)

(72) Inventor: Kazushige Shimada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 18/746,166

(22) Filed: Jun. 18, 2024

(65) Prior Publication Data

US 2025/0013402 A1 Jan. 9, 2025

(30) Foreign Application Priority Data

Jul. 4, 2023 (JP) ................................ 2023-110141

(51) Int. Cl.
*G06F 3/12* (2006.01)

(52) U.S. Cl.
CPC .......... *G06F 3/1236* (2013.01); *G06F 3/1203* (2013.01)

(58) Field of Classification Search
CPC .... G06F 3/1236; G06F 3/1203; G06F 3/1207; G06F 3/121; G06F 3/1229; G06F 3/1259
See application file for complete search history.

(56) References Cited

U.S. PATENT DOCUMENTS

2023/0367530 A1* 11/2023 Sako .................... G06F 3/1204

FOREIGN PATENT DOCUMENTS

JP 2022-089143 A 6/2022

* cited by examiner

*Primary Examiner* — Christopher Wait
(74) *Attorney, Agent, or Firm* — VENABLE LLP

(57) ABSTRACT

A printing apparatus is capable of being in a first connection state in which the printing apparatus is communicably connected to an information processing apparatus via a server and a second connection state in which the printing apparatus is communicably connected to the information processing apparatus without using the server. A printer information storage section stores a cloud icon indicating a printer in the first connection state and a local icon which is an icon indicating the printer in the second connection state and is different in visual recognition from the cloud icon. A network communication section transmits first information including the cloud icon to a cloud print service in a case where the printer is in the first connection state and transmits second information including the local icon to a client computer in a case where the printer is in the second connection state.

16 Claims, 19 Drawing Sheets

PRINTING APPARATUS CAPABLE OF DISPLAYING ICON INDICATING CONNECTION STATE, METHOD OF CONTROLLING PRINTING APPARATUS, AND STORAGE MEDIUM

BACKGROUND OF THE INVENTION

Field of the Invention

The present invention relates to a printing apparatus that is capable of displaying an icon indicating a connection state, a method of controlling the printing apparatus, and a storage device.

Description of the Related Art

Conventionally, in a case where a print instruction is provided from a terminal apparatus, such as a personal computer, to a printer (printing apparatus), a printer driver supplied from the printer or a printer vendor (printer maker) that manufactures the printer is used. In recent years, a standard driver provided by an OS maker that manufactures an operating system (OS) is sometimes used. By using the standard driver, it is possible to provide a print instruction from a terminal apparatus to a printer and perform printing by the printer without using the printer driver provided by the printer vendor. For example, a standard driver referred to as the "IPP class driver" is installed in Windows (registered trademark). A standard driver referred to as the "Mopria (registered trademark)" is installed in Android (registered trademark). A standard driver referred to as the "Air Print (registered trademark)" is installed in iOS (registered trademark) as one function of the OS. These standard drivers each are a driver that transmits a print command conforming to a print protocol referred to as the Internet Printing Protocol (IPP). A printer supporting the IPP can receive the print command and execute printing. Therefore, the standard driver has compatibility with a plurality of types of printers and can cause each printer to execute printing.

For example, Japanese Laid-Open Patent Publication (Kokai) No. 2022-89143 discloses a configuration in which a printer driver or a print setting-extending application which operates in cooperation with the printer driver acquires image data of an icon expressing the appearance of a printer from the printer or a cloud print service. With the configuration described in Japanese Laid-Open Patent Publication (Kokai) No. 2022-89143, it is possible to display the icon based on the image data of the icon on a user interface (UI) of the print setting-extending application or a printer management screen provided by the OS. Further, in either case of a case where a terminal apparatus is connected to a printer via a local area network (LAN) (hereinafter referred to as the "local printer") and a case where a terminal apparatus connected to a printer on a cloud print service (hereinafter referred to as the "cloud printer"), it is possible to acquire the image for the icon.

However, according to the configuration described in Japanese Laid-Open Patent Publication (Kokai) No. 2022-89143, in a case where the local printer and the cloud printer are the same model, the acquired images for the icon are the same, and hence the icons displayed e.g. on the printer management screen become the same. As a result, it is difficult for a user to distinguish which of the local printer and the cloud printer is indicated by each icon.

SUMMARY OF THE INVENTION

The present invention provides a printing apparatus that enables a user to distinguish which of connection states of a printing apparatus is indicated by an icon, a method of controlling the printing apparatus, and a storage medium.

In a first aspect of the present invention, there is provided a printing apparatus that is capable of being in a first connection state in which the printing apparatus is communicably connected to an information processing apparatus via a server and a second connection state in which the printing apparatus is communicably connected to the information processing apparatus without using the server, including a storage unit configured to store a first icon indicating the printing apparatus in the first connection state and a second icon which is an icon indicating the printing apparatus in the second connection state and is different in visual recognition from the first icon, and a transmission unit configured to be capable of transmitting first information including the first icon to the server in a case where the printing apparatus is in the first connection state and transmitting second information including the second icon to the information processing apparatus in a case where the printing apparatus is in the second connection state.

In a second aspect of the present invention, there is provided a method of controlling a printing apparatus that is capable of being in a first connection state in which the printing apparatus is communicably connected to an information processing apparatus via a server and a second connection state in which the printing apparatus is communicably connected to the information processing apparatus without using the server, wherein the printing apparatus stores a first icon indicating the printing apparatus in the first connection state and a second icon which is an icon indicating the printing apparatus in the second connection state and is different in visual recognition from the first icon, the method including transmitting first information including the first icon to the server in a case where the printing apparatus is in the first connection state and transmitting second information including the second icon to the information processing apparatus in a case where the printing apparatus is in the second connection state.

According to the present invention, it is possible to enable a user to distinguish which of connection states of a printing apparatus is indicated by an icon.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. However, the configuration described in the following embodiments is given only by way of example, and is by no means intended to limit the scope of the present invention. For example, components of the configuration of the present invention can be replaced by desired components which can exhibit the same functions, respectively. Further, desired components can be added. Further, two or more desired configurations (features) of the embodiments can be combined.

Figure 1:
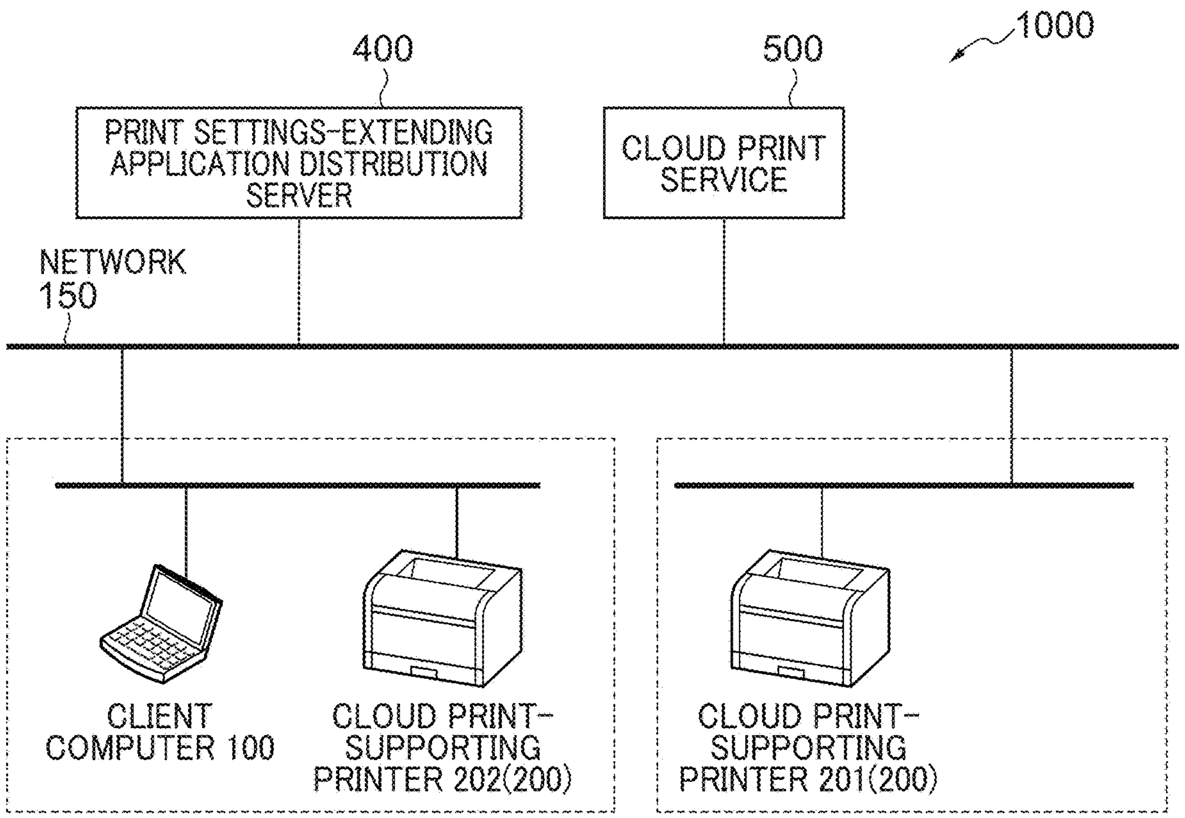
FIG. 1 is a diagram schematically showing a configuration of a printing system according to a first embodiment.

A first embodiment will be described below with reference to FIGS. 1 to 10. FIG. 1 is a diagram schematically showing a configuration of a printing system according to the first embodiment. As shown in FIG. 1, the printing system, denoted by reference numeral 1000, includes a client computer 100, a plurality of cloud print-supporting printers 200, a print setting-extending application distribution server 400, and a cloud print service 500. These are connected via a network 150 in a state communicable with each other. The number of the cloud print-supporting printers 200 disposed in the present embodiment is two. One of the cloud print-supporting printers 200 is referred to as the cloud print-supporting printer 201, and the other cloud print-supporting printer 200 is referred to as the cloud print-supporting printer 202. The cloud print-supporting printer 201 is a cloud printer which is communicably connected to the client computer 100 via the cloud print service 500. A state in which the cloud print-supporting printer 201 is communicably connected to the client computer 100 via the cloud print service 500 is hereinafter referred to as the first connection state. The cloud print-supporting printer 202 is a local printer which is communicably connected directly to the client computer 100 without using the cloud print service 500, i.e. connected via a local area network. A state in which the cloud print-supporting printer 202 is communicably connected to the client computer 100 without using the cloud print service 500 is hereinafter referred to as the second connection state (local connection).

Note that the cloud print-supporting printer 201 can also be a local printer which is communicably connected to another client computer (not shown) which is different from the client computer 100 without using the cloud print service 500. That is, the cloud print-supporting printer 201 can take the second connection state. On the other hand, the cloud print-supporting printer 202 can also be a cloud printer communicably connected to the client computer 100 via the cloud print service 500. That is, the cloud print-supporting printer 202 can take in the first connection state. Further, the number of the cloud print-supporting printers 200 disposed in the present embodiment is two but is not limited to this, and for example, the number can be one or three or more.

The print setting-extending application distribution server 400 is a server that executes a service for distributing an application to be executed by the client computer 100 and is sometimes managed e.g. by a printer vendor (printer maker) that manufactures printers. The client computer 100 can receive a user operation for requesting installation of e.g. a print setting-extending application 1052 (see FIG. 2). In this case, the print setting-extending application 1052 is installed in the client computer 100 from the print setting-extending application distribution server 400. Further, in a case where an identifier of an application is included in an information file (Inf file) of the printer driver, the print setting-extending application 1052 and the like are also installed in the client computer 100 from the print setting-extending application distribution server 400.

The cloud print service 500 is a service that performs print control on a print server system formed by a plurality of servers. The cloud print service 500 performs account management based on a user ID and a password. A user can access the cloud print service 500 by using his/her user ID and password.

Figure 2:
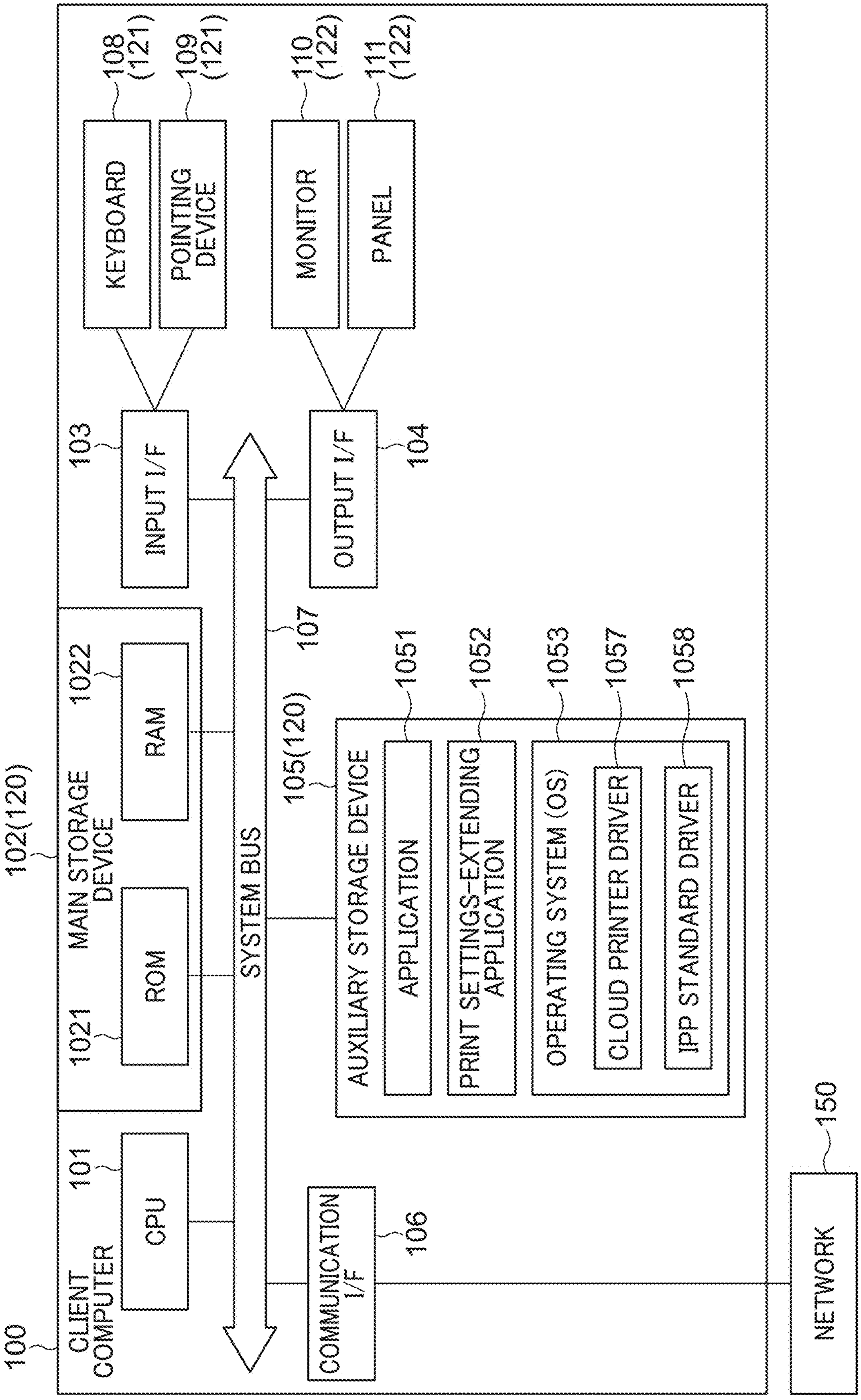
FIG. 2 is a block diagram showing a hardware configuration of a client computer.

FIG. 2 is a block diagram showing a hardware configuration of the client computer 100. The client computer 100 shown in FIG. 2 is preferably e.g. a desktop-type or laptop-type personal computer, but is not limited to this, and can be an information processing apparatus, such as a tablet terminal or a smartphone. The client computer 100 includes a CPU 101, an input interface (I/F) 103, an output I/F 104, a communication I/F 106, a system bus 107, storage devices 120, input devices 121, and output devices 122. The CPU 101, the input I/F 103, the output I/F 104, the communication I/F 106, and the storage devices 120 are communicably interconnected via the system bus 107. The storage devices 120 are a main storage device 102 and an auxiliary storage device 105. The main storage device 102 includes a read only memory (ROM) 1021 and a random access memory (RAM) 1022.

The CPU 101 controls the overall operation of the client computer 100 according to programs stored in the ROM 1201. The RAM 1022 is also used as a work area when the CPU 101 performs a variety of processing operations. The input devices 121 are a keyboard 108 and a pointing device 109. The input devices 121 are communicably connected to the system bus 107 via the input I/F 103 and are used by a user to provide a variety of instructions to the client computer 100. The output devices 122 are a monitor 110 and a panel 111. The output devices 122 are communicably connected to the system bus 107 via the output I/F 104 to output data and the like. The client computer 100 is communicably connected to the network 150 via the communication I/F 106. The auxiliary storage device 105 stores an application 1051, the print setting-extending application 1052, and an operating system (OS) 1053. The OS 1053 has a cloud printer driver 1057 and an Internet Printing Protocol (IPP) standard driver 1058 installed in the OS 1053, as the standard drivers.

The application 1051 is, for example, an application that is capable of editing a document and creating presentation materials. Data generated by using the application 1051 can be printed by each cloud print-supporting printer 200 by operating the input devices 121. The print setting-extending application 1052 is an application that operates in cooperation with the cloud printer driver 1057 and the IPP standard driver 1058. The print setting-extending application 1052 has a function of configuring print settings of each cloud print-supporting printer 200. Further, by using the print setting-extending application 1052, it is possible to store, for each cloud print-supporting printer 200, an icon indicating the cloud print-supporting printer 200 in the auxiliary storage device 105. The icon is in the form of a figure or a pictogram.

The cloud printer driver 1057 is a printer control program. The cloud printer driver 1057 can provide a print instruction to the cloud print-supporting printer 200 regardless of its model insofar as it is the cloud print-supporting printer 200 connected to the cloud print service 500, i.e. connected in the first connection state. The cloud print-supporting printer 200 in this case is the cloud print-supporting printer 201, and the cloud printer driver 1057 can provide a print instruction to the cloud print-supporting printer 201. With this, it is possible to perform printing using the cloud print-supporting printer 201. As described above, the cloud print-supporting printer 202 can also be connected in the first connection state. In this case, the cloud printer driver 1057 can provide a print instruction to the cloud print-supporting printer 202. The IPP standard driver 1058 is a printer control program. The IPP standard driver 1058 can provide a print instruction to the cloud print-supporting printer 200 regardless of its model insofar as it is the cloud print-supporting printer 200 connected according to the IPP protocol, i.e. connected in the second connection state. The cloud print-supporting printer 200 in this case is the cloud print-supporting printer 202, and the IPP standard driver 1058 can provide a print instruction (transmit a print job) to the cloud print-supporting printer 202. With this, it is possible to perform printing using the cloud print-supporting printer 202.

Figure 3:
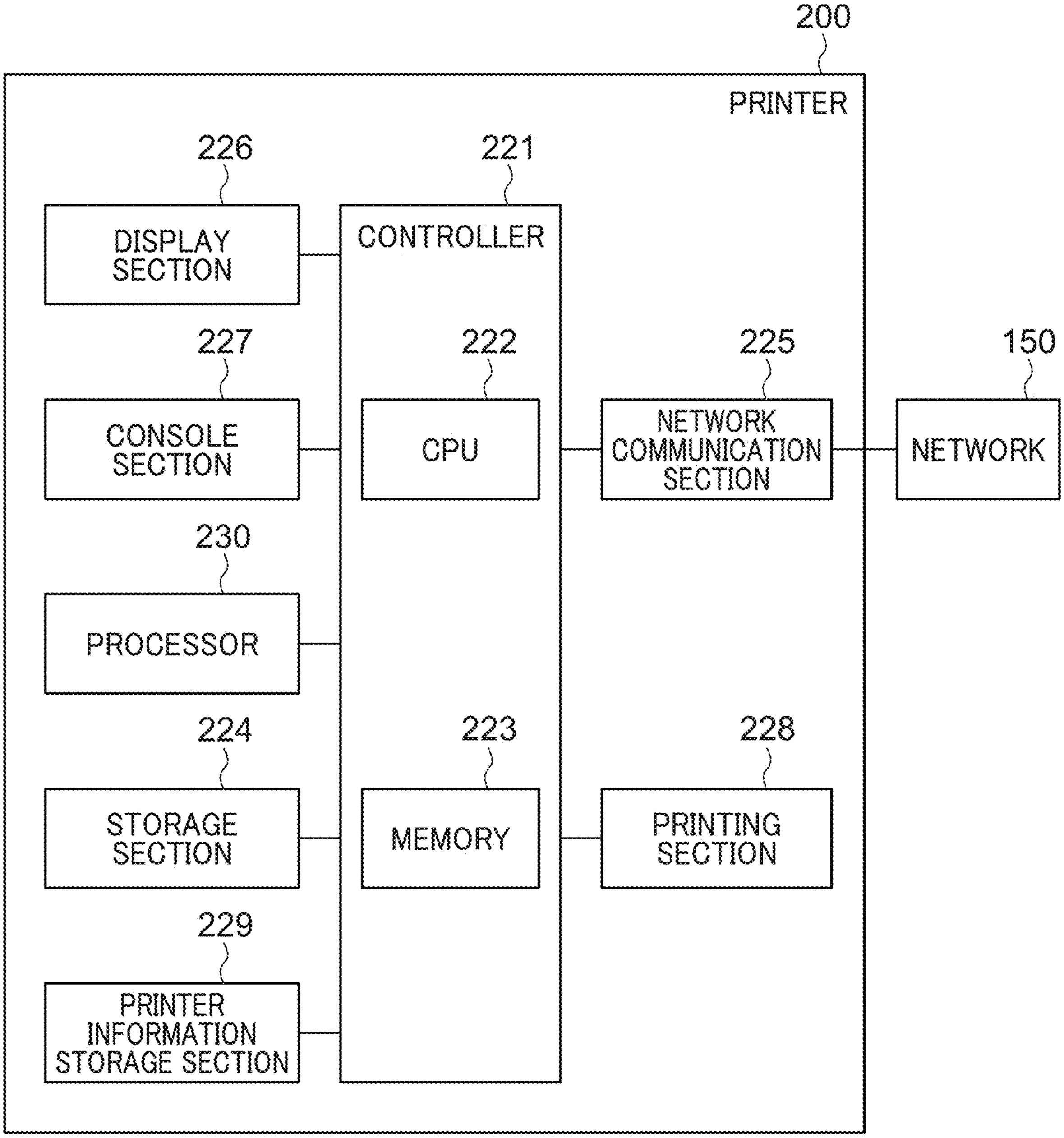
FIG. 3 is a block diagram showing a hardware configuration of a cloud print-supporting printer.

FIG. 3 is a block diagram showing a hardware configuration of the cloud print-supporting printer 200. The cloud print-supporting printer 200 shown in FIG. 3 is preferably a Multi-Function Peripheral (MFP), for example, but is not limited to this, and can be an image forming apparatus, such as a Single-Function Printer (SFP). The cloud print-supporting printer 200 includes a controller 221, a storage section 224, a network communication section 225, a display section 226, a console section 227, a printing section (printing unit) 228, a printer information storage section (storage unit) 229, and a processor 230. The controller 221 includes a CPU 222 and a memory 223. The controller 221 controls the overall operation of the cloud print-supporting printer 200. The CPU 222 reads out control programs stored in the storage section 224 and performs a variety of controls, such as print control and reading control. The memory 223 is used as a work area or a temporarily storing area for loading the variety of control programs. The storage section 224 stores print data, image data, the variety of programs, and a variety of setting information items. The variety of programs include e.g. a program for causing a computer to execute a method of controlling the components and means of the cloud print-supporting printer 200 (method of controlling the printing apparatus). As the storage section 224, an auxiliary storage device, such as a Hard Disk Drive (HDD), is preferably used but is not limited to this, and for example, a nonvolatile memory, such as a Solid State Drive (SSD) can be used. In the present embodiment, hardware components including the CPU 222, the memory 223, and the storage section 224 form a computer.

The processor 230 has a function of a Raster Image Processor (RIP) for loading print data received via the network 150 and generating a print image. Further, the processor 230 also has an image processing capability for performing resolution conversion and correction processing of an image. The processor 230 is preferably implemented by a hardware circuit (such as an application specific integrated circuit (ASIC) or a field-programmable gate array (FPGA)) but is not limited to this. For example, the cloud print-supporting printer 200 can have a processor for image processing, and the image processing and the processing for loading print data can be executed by the processor executing an image processing program. Further, the image processing and the processing for loading print data can be executed by the CPU 222 executing the program for performing the image processing. Further, the processor 230 analyzes print data and generates a print image. The print image is transferred from the controller 221 to the printing section 228 together with a control command. The printing section 228 can print an image on a sheet (recording medium) fed from a sheet feed cassette (not shown) based on the print image. The printing in the printing section 228 is performed by using one of the printing materials of ink and toner. Further, the controller 221 also functions as remaining amount-detecting means for detecting a remaining amount of the printing material. Further, the controller 221 also functions as status detecting means for detecting a status of the cloud print-supporting printer 200.

The display section 226 displays a variety of information items, such as images. The console section 227 is comprised of a crystal display section having a touch panel function and a variety of hard keys. The display section 226 and the console section 227 also function as a receiving section for receiving an instruction from a user. Further, the cloud print-supporting printer 200 can have a reading section (not shown) that reads an original and generates a read image. In this case, the read image generated by the reading section is stored in the storage section 224. Further, the controller 221 is connected to the network 150 via the network communication section 225. The network communication section 225 transmits an image and information to an apparatus on the network 150 and receives print data and information from an apparatus on the network 150. The printer information storage section 229 stores, for example, a hardware ID (hereinafter referred to as the "HWID") as an identifier for identifying the cloud print-supporting printer 200, printer capability information, described hereinafter, and an icon indicating the cloud print-supporting printer 200. Note that the printer information storage section 229 can be included in the storage section 224.

Figure 4:
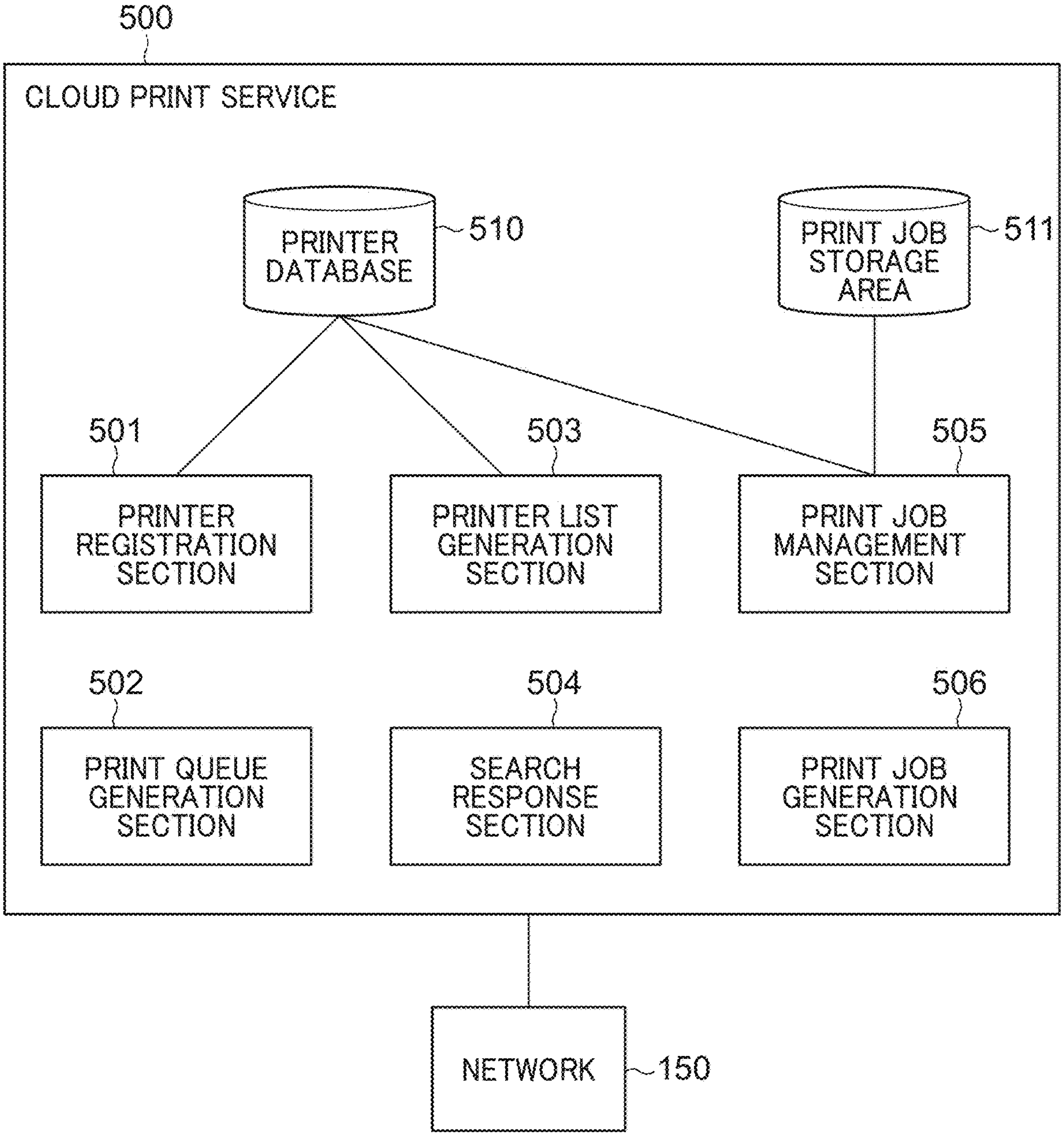
FIG. 4 is a block diagram showing a hardware configuration of a cloud print service.

FIG. 4 is a block diagram showing a hardware configuration of the cloud print service 500. The cloud print service 500 shown in FIG. 4 is a service existing on a cloud via the network 150 and has a function related to printing. Further, the cloud print service 500 can provide a cloud print function based on the "IPP Infra". The cloud print service 500 includes a printer registration section 501, a print queue generation section 502, a printer list generation section 503, a search response section 504, a print job management section 505, a print job generation section 506, a printer database 510, and a print job storage area 511.

The printer registration section 501 causes the print queue generation section 502 to generate a print queue in a case where a print registration instruction is received from the cloud print-supporting printer 201. The print queue is registered in the printer database 510 in a state associated with printer identification information. In the present embodiment, a state in which a print queue and printer identification information are registered in a state associated with each other is referred to as a "state in which the printer is registered". To the registered printer, attributes including a location of the printer, are sometimes added. Further, the printer database 510 can also store an icon indicating the cloud print-supporting printer 200. The printer list generation section 503 generates a list of printers registered in the printer database 510. The search response section 504 transmits information on printers registered in the printer database 510 in response to an event for searching for a printer, which has been transmitted from the client computer 100 to the cloud print service 500. The print job management section 505 receives a print job from the client computer 100. Then, the print job management section 505 directly transmits the print job to the cloud print-supporting printer 201 associated with a print queue designated from the client computer 100. Note that the print job management section 505 can temporarily store the print job in the print job storage area 511 and transmit the print job at a time when the cloud print-supporting printer 201 as the output destination is determined.

Figure 5:
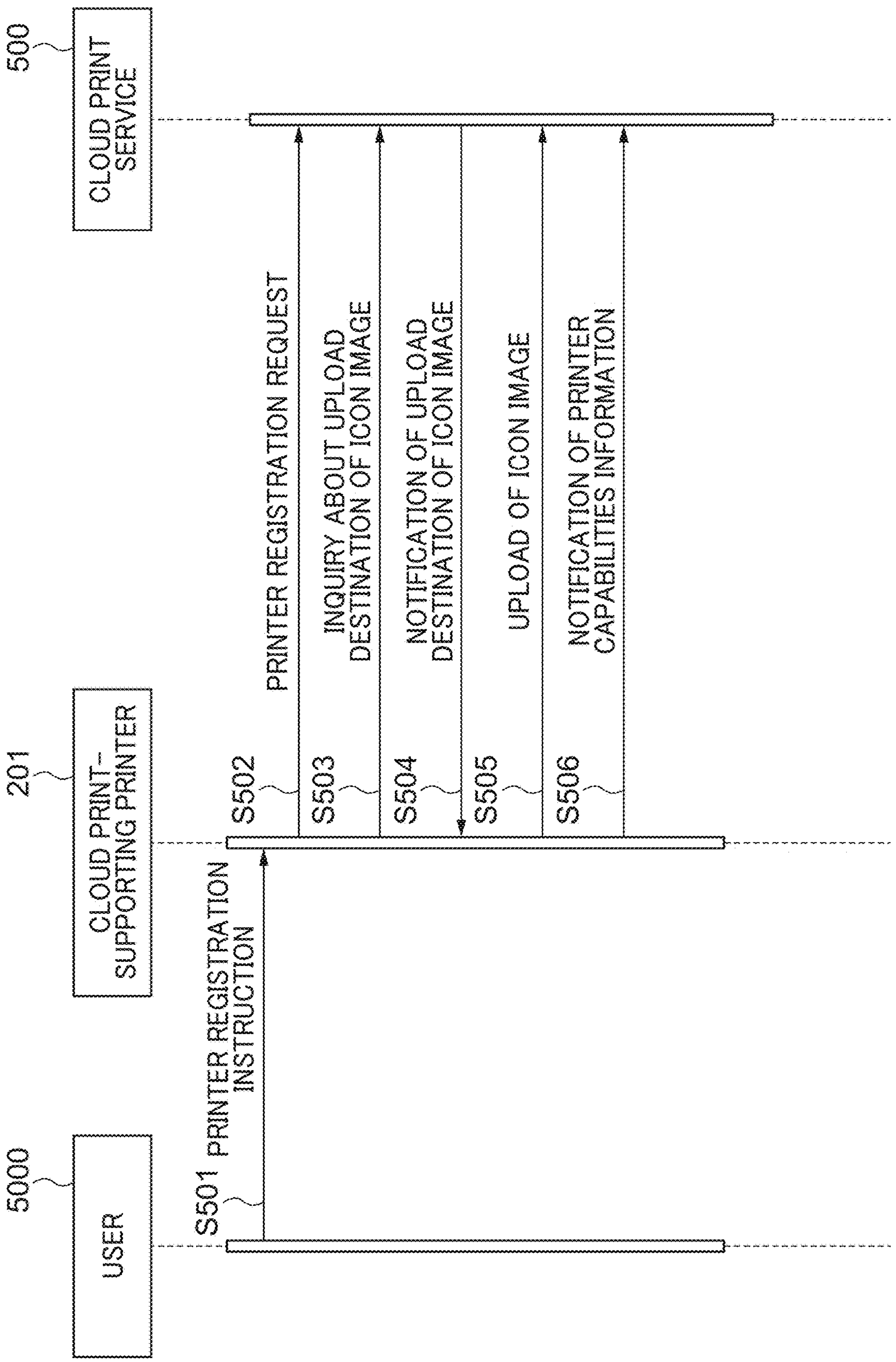
FIG. 5 is a sequence diagram showing a process executed between a user, the cloud print-supporting printer, and the cloud print service.

FIG. 5 is a sequence diagram showing a process executed between a user, the cloud print-supporting printer, and the cloud print service. Here, a description will be given of a process up to a step in which the cloud print-supporting printer 201 registers an icon image (icon) indicating the cloud print-supporting printer 201 in the cloud print service 500. The process based on the sequence diagram shown in FIG. 5 is started when a user 5000 instructs registration in the cloud print service 500 to the cloud print-supporting printer 201. As shown in FIG. 5, in a step S501, the user 5000 operates the console section 227 of the cloud print-supporting printer 201 to thereby provide an instruction for registering information on the cloud print-supporting printer 201 in the cloud print service 500. With this, the cloud print-supporting printer 201 can receive the instruction. Thus, in the present embodiment, the console section 227 also functions as an operation unit configured to perform the operation of registering the cloud print-supporting printer 201 in the cloud print service 500. Note that the registration operation can also be performed by accessing a WEB server function of the cloud print-supporting printer 201 from the client computer 100. In this case, the user 5000 is required to be authenticated to log into the cloud print service 500 with his/her account. On the cloud print-supporting printer 201, an authentication screen provided by the cloud print service 500 is displayed. The user 5000 inputs user identification information and a password on the authentication screen. The user identification information and the password are transmitted to an authentication server (not shown). With this, user authentication is performed, whereby the user 5000 can log into the cloud print service 500.

In a step S502, the cloud print-supporting printer 201 transmits a request for registering the cloud print-supporting printer 201, which has been instructed in the step S501, to the cloud print service 500 via the network communication section 225 which is a transmission unit. With this, the printer registration section 501 of the cloud print service 500 can receive this registration request. After receiving the registration request, the printer registration section 501 causes the print queue generation section 502 to generate a print queue. The print queue is registered in the printer database 510 in a state associated with the printer identification information. Through generation and registration of the print queue, the cloud print service 500 is enabled to transmit print data received from the client computer 100 to the cloud print-supporting printer 201. Further, the cloud print service 500 notifies the cloud print-supporting printer 201 of identification information of the print queue.

In a step S503, the cloud print-supporting printer 201 inquires the cloud print service 500 about an upload destination of an icon image indicating the cloud print-supporting printer 201. This inquiry is performed via the network communication section 225. The cloud print-supporting printer 201 designates the print queue generated in the step S502 and transmits "Get-Printer-Attributes" which is an IPP operation. The print queue is designated by using the identification information of the print queue, which has been received from the cloud print service 500. Further, when the inquiry about the upload destination is transmitted, an IPP attribute "printer-static-resource-directory-uri" is set as an argument of the operation. The "printer-static-resource-directory-uri" is an argument for acquiring a Uniform Resource Identifier (URI) of a storage which can store the information on the cloud print-supporting printer 201.

In a step S504, the cloud print service 500 transmits a response in which a value of "printer-static-resource-directory-uri" is set, to the cloud print-supporting printer 201 via the communication I/F 106. With this, the cloud print-supporting printer 201 receives this response and is notified of the destination of uploading the icon. Note that the value of "printer-static-resource-directory-uri" is a value indicating a location of a storage which can be used in association with the print queue generated in the step S502. Specifically, as the response transmitted in the step S504, a URL starting from "http" or "https" is transmitted. The URL is e.g. "https://<URL of the cloud print service>/ipp/resource/<uniquely determined ID of the printer>". The ID of the printer is an ID issued when the print queue is generated and registered in the printer database 510 in the step S502. This ID can be a character string including e.g. the name of the cloud print-supporting printer 201, the serial number of the cloud print-supporting printer 201, or the IP address of the cloud print-supporting printer 201. As an example of the URL, there can be mentioned "https://print.print-dev.com/ipp/resource/0cc23168-d681-49b4-bc22-ef704a024aff".

In a step S505, the cloud print-supporting printer 201 receives the response transmitted in the step S504 and uploads the icon to the URL as the upload destination included in this response, i.e. transmits the icon via the network communication section 225. The icon uploaded in this step has been stored in the printer information storage section 229 of the cloud print-supporting printer 201.

Figure 6A:
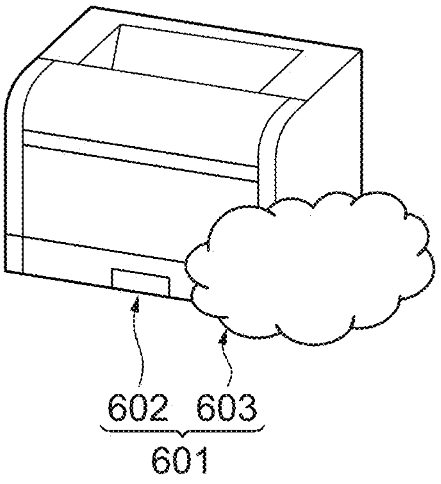
FIGS. 6A and 6B are diagrams each showing an example of an icon indicating the cloud print-supporting printer.
Figure 6B:
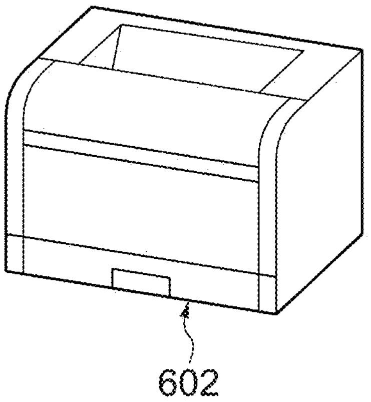

The icon will be described with reference to FIGS. 6A and 6B. FIGS. 6A and 6B are diagrams each showing an example of the icon indicating the cloud print-supporting printer. FIG. 6A is a diagram showing the icon indicating the cloud print-supporting printer in the first connection state. FIG. 6B is a diagram showing the icon indicating the cloud print-supporting printer in the second connection state. The cloud icon (first icon), denoted by reference numeral 601, shown in FIG. 6A is an icon indicating the cloud print-supporting printer 200 in the first connection state, i.e. the cloud printer. The local icon (second icon), denoted by reference numeral 602, shown in FIG. 6B, is an icon indicating that the cloud print-supporting printer 200 is in the second connection state, i.e. the local printer. The local icon 602 is an image (appearance image) representing the cloud print-supporting printer 200, which is formed to schematically resemble the appearance of the cloud print-supporting printer 200. The cloud icon 601 includes the local icon 602 and a cloud 603 as an image formed to schematically resemble the appearance of a cloud. The cloud 603 is an image (connection state image) for indicating that the printer is a printer connected in the first connection state, i.e. the cloud printer, and is arranged in a state overlapped on the image of the local icon 602. Thus, in the present embodiment, the cloud icon 601 and the local icon 602 are different in shape from each other. With this, the cloud icon 601 and the local icon 602 are different in visual recognition and can be easily distinguished. Note that the cloud icon 601 and the local icon 602 can be made different in color with the same shape. In this case, the cloud icon 601 and the local icon 602 are also different in visual recognition, and therefore, the icons can be easily visually distinguished from each other. Further, the cloud icon 601 and the local icon 602 can each include e.g. the name and the model number of the cloud print-supporting printer 200, and a manufacturer (maker) of the cloud print-supporting printer 200. Further, the cloud icon 601 and the local icon 602 can be each prepared in a plurality of types to be made available for use.

The cloud print-supporting printer 201 is the cloud printer connected in the first connection state. Therefore, in the step S505, the cloud print-supporting printer 201 uploads information including the cloud icon 601 (hereinafter referred to as the "first information") to the upload destination (cloud print service 500) by using an HTTP PUT request. As described above, the cloud print-supporting printer 201 can also become the local printer by being connected in the second connection state. In this case, the cloud print-supporting printer 201 can transmit information including the local icon 602 (hereinafter referred to as the "second information") to the other client computer mentioned hereinabove. On the other hand, similar to the cloud print-supporting printer 201, the cloud print-supporting printer 202 can also upload the first information to the upload destination when connected in the first connection state and transmit the second information to the client computer 100 when connected in the second connection state. Further, even when the cloud print-supporting printer 201 is connected in the first connection state, in a case where the first information has already been transmitted, the cloud print-supporting printer 201 can omit transmission of the first information (the same is applied to the cloud print-supporting printer 202). Further, even when the cloud print-supporting printer 201 is connected in the second connection state, in a case where the second information has already been transmitted, the cloud print-supporting printer 201 can omit transmission of the second information (the same is applied to the cloud print-supporting printer 202).

In a step S506, the cloud print-supporting printer 201 notifies the cloud print service 500 of the printer capability information. The "printer capability information (sometimes simply referred to as the "capability information") refers to output information related to the output conditions of the cloud print-supporting printer 200. This output information is not particularly limited, but for example, a setting of a color mode which can be performed by the cloud print-supporting printer 201, a sheet size setting, a sheet type setting, a setting of finishing, such as stapling, and so forth are included. In the step S506, specifically, the cloud print-supporting printer 201 transmits the printer capability information to the cloud print service 500 using "Update-Output-Device-Attributes" defined by the IPP. The "Update-Output-Device-Attributes" is an IPP operation, which can update values of the IPP attributes. When transmitting the printer capability information, a value linking the IPP attribute "printer-icons", the name of the icon uploaded in the step S505, and a path of the upload destination is obtained. This linking value is set in the "Update-Output-Device-Attributes". For example, in a case where the file name of the icon uploaded in the step S505 is "512.png", "https://print.print-dev.com/ipp/resource/0cc23168-d681-49b4-bc22-ef704a024aff/512.png" is set. With this, it is possible to notify the cloud print service 500 that the icon uploaded in the step S505 is the icon indicating the cloud print-supporting printer 201.

Note that in the steps S503 to S505, the following processing can be performed: In the step S503, the cloud print-supporting printer 201 inquires the cloud print service 500 not only about the upload destination of the icon image, but also an available capacity of the upload destination. Specifically, the cloud print-supporting printer 201 inquires the cloud print service 500 about the available capacity of the storage area which is to be the upload destination, using "printer-static-resource-k-octets-free" defined by the IPP. The cloud print-supporting printer 201 can receive the upload destination and the available capacity of the storage area of the upload destination from the cloud print service 500 as the notification in the step S504. In the step S505, the cloud print-supporting printer 201 compares the data size of the icon image and the available capacity received in the step S504. As a result of this comparison, if the data size of the icon image is equal to or smaller than the available capacity, the cloud print-supporting printer 201 uploads the icon to the upload destination. On the other hand, as a result of this comparison, if the data size of the icon image is larger than the available capacity, the cloud print-supporting printer 201 does not upload the icon.

Further, in a case where a plurality of icons are uploaded in the step S505, a list of URLs corresponding in number to the number of the icons and "printer-icons" are set in the "Update-Output-Device-Attributes". Then, it is preferable that "Update-Output-Device-Attributes" by the IPP is transmitted to the cloud print service 500. The cloud print service 500 having received the "Update-Output-Device-Attributes" rewrites a value of the IPP attribute "printer-icons" of the print queue with the notified value. With this, in a case where a capability acquisition request of "printer-icons" is transmitted from the OS 1053 to the cloud print service 500, the cloud print service 500 transmits the path of the cloud icon 601 to the client computer 100 as a response. On the other hand, in a case where a capability acquisition request of "printer-icons" is transmitted from the OS 1053 to the cloud print-supporting printer 202, the cloud print-supporting printer 202 transmits the path of the local icon 602 to the client computer 100 as a response.

Figure 7:
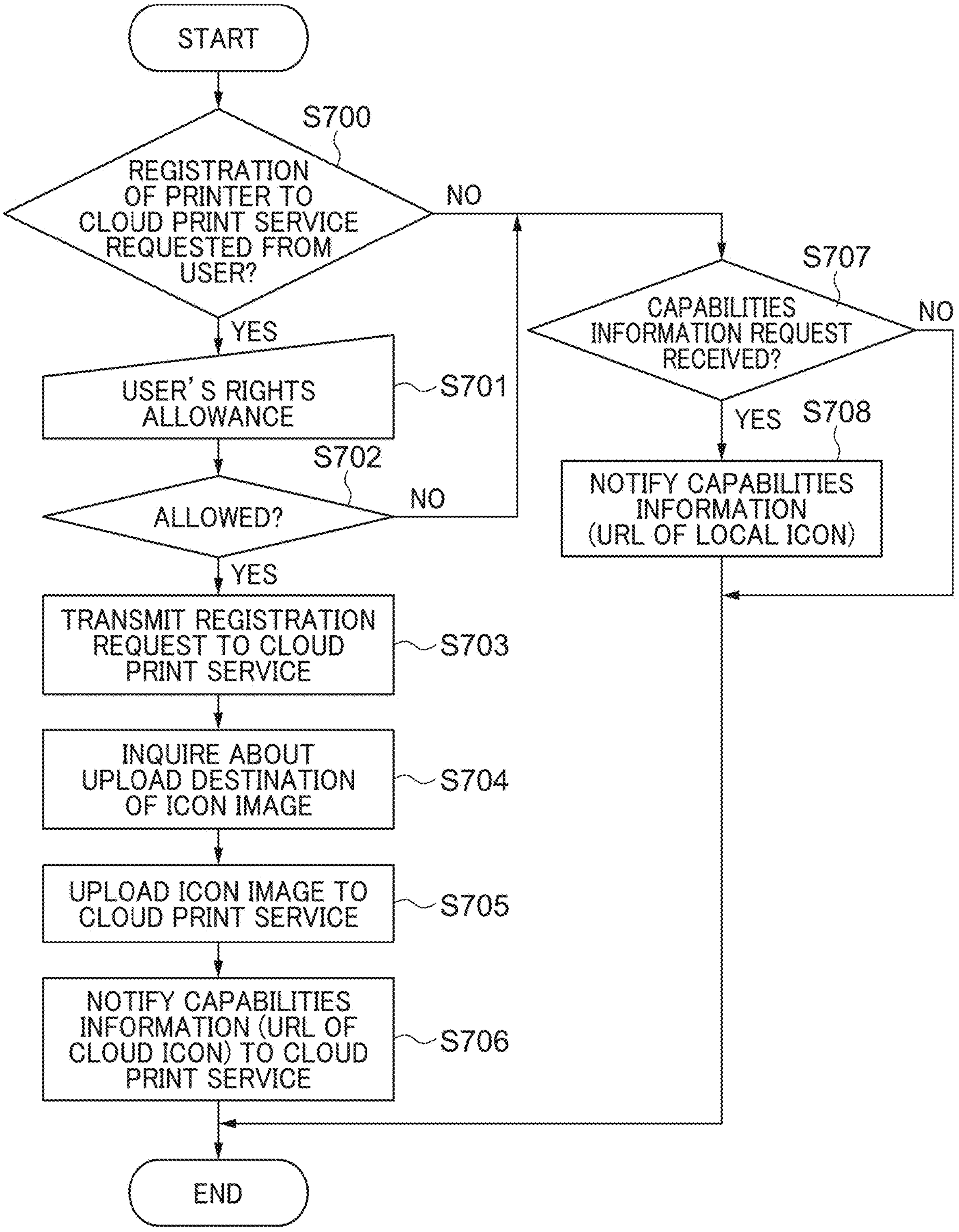
FIG. 7 is a flowchart of a process performed by the cloud print-supporting printer.

FIG. 7 is a flowchart of a process performed by the cloud print-supporting printer. Here, a description will be given of a process performed by the cloud print-supporting printer 202 out of the cloud print-supporting printer 201 and the cloud print-supporting printer 202 as a representative of the cloud print-supporting printers 200. Further, this process is a process performed concerning which of the cloud icon 601 and the local icon 602 is to be transmitted according to the first connection state or the second connection state. The program based on the flowchart in FIG. 7 is started when a main power of the cloud print-supporting printer 202 is turned on to enable the cloud print-supporting printer 202 to be operated. Further, the cloud print-supporting printer 202 is connected in the second connection state to thereby function as the local printer, and is connected in the first connection state to thereby function as the cloud printer as well. Note that determination on whether the cloud print-supporting printer 202 is connected in the first connection state or in the second connection state is performed, for example, by the CPU 222 (state determination unit) based on the communication state via the network communication section 225 of the cloud print-supporting printer 202. Further, in the printer information storage section 229 of the cloud print-supporting printer 202, the cloud icon 601 indicating that the cloud print-supporting printer 202 functions as the cloud printer and the local icon 602 indicating that the cloud print-supporting printer 202 functions as the local printer are stored.

As shown in FIG. 7, in a step S700, the CPU 222 of the cloud print-supporting printer 202 determines whether or not there is a request for registering the cloud print-supporting printer 202 in the cloud print service 500. This determination processing is performed based on whether or not the operation of registering the cloud print-supporting printer 202 has been performed on the console section 227. In a case where the operation of registering the cloud print-supporting printer 202 has been performed, it is determined that there is a request for registering the cloud print-supporting printer 202. On the other hand, in a case where the operation of registering the cloud print-supporting printer 202 has not been performed, it is determined that there is no request for registering the cloud print-supporting printer 202. Thus, in the present embodiment, the CPU 222 also functions as an operation determination unit configured to determine presence/absence of the registration operation. Then, if it is determined in the step S700 that there is a request for registering the cloud print-supporting printer 202, the process proceeds to a step S701. On the other hand, if it is determined in the step S700 that there is no request for registering the cloud print-supporting printer 202, the process proceeds to a step S707.

In the step S701, in a case where the user 5000 undergoes user authentication in the cloud print service 500, the user 5000 inputs the user identification information and the password on the authentication screen provided by the cloud print service 500 and requests the cloud print service 500 to allow the user rights to the user 5000. After execution of the step S701, the process proceeds to a step S702. Note that in a case where the user authentication is not required, the steps S701 and S702 can be omitted.

In the step S702, the CPU 222 determines whether or not the user rights requested in the step S701 have been allowed. If it is determined in the step S702 that the user rights have been allowed, the process proceeds to a step S703. On the other hand, if it is determined in the step S702 that the user rights have not been allowed, the process proceeds to the step S707.

In the step S703, the CPU 222 transmits a request for registering the cloud print-supporting printer 202, which has been received in the step S700, to the cloud print service 500 via the network communication section 225. With this, the printer registration section 501 of the cloud print service 500 can receive the registration request.

In a step S704, the CPU 222 inquires the cloud print service 500 about the upload destination of the cloud icon 601 indicating the cloud print-supporting printer 202 in the first connection state via the network communication section 225. With this, the cloud print service 500 can transmit the upload destination as a response to the inquiry to the cloud print-supporting printer 202. Then, the CPU 222 can receive the upload destination transmitted from the cloud print service 500 via the network communication section 225.

In a step S705, the CPU 222 transmits the first information including the cloud icon 601 to the upload destination received in the step S704 via the network communication section 225. With this, the first information is stored in the printer database 510 of the cloud print service 500. Note that in the step S705, transmission of the second information including the local icon 602 is inhibited. With this, it is possible to prevent the second information from being received by the cloud print service 500 and erroneously stored in the cloud print service 500.

In a step S706, the CPU 222 transmits the printer capability information via the network communication section 225. With this, the printer capability information is stored in the printer database 510 of the cloud print service 500. Further, in the printer database 510, the value of the IPP attribute "printer-icons" of the printer is updated with the URL of the cloud icon 601. Note that although the printer capability information is part of the first information, the printer capability information and the cloud icon 601 are transmitted at different times. This makes it possible to quickly transmit the printer capability information and the cloud icon 601. On the other hand, in a case where the printer capability information and the cloud icon 601 are collectively transmitted e.g. in a state in which the maximum speed of communication between the cloud print-supporting printer 202 and the cloud print service 500 is relatively low, there is a fear that it can take time to transmit the information. After execution of the step S706, the present process is terminated.

In the step S707 after execution of the step S700 or the step S702, the CPU 222 determines whether or not a printer capability information request has been received from the client computer 100. Thus, in the present embodiment, the CPU 222 has a function of a request determination unit configured to determine presence/absence of a printer capability information request. Further, this determination processing is executed based on whether or not the value of "printer-icons" in the IPP operation "Get-Printer-Attributes" has been requested from the client computer 100. In a case where the request has been received from the client computer 100, it is determined that the printer capability information request has been received. In a case where this request has not been received from the client computer 100, it is determined that the printer capability information request has not been received. Then, if it is determined in the step S707 that the printer capability information request has been received, the process proceeds to a step S708. On the other hand, if it is determined in the step S707 that the printer capability information request has not been received, the present process is terminated.

In the step S708, the CPU 222 transmits the value of "printer-icons" requested in the step S707 to the client computer 100 via the network communication section 225. This value is the URL indicating the local icon 602 and is included in the second information. As this URL, for example, "http://<IP address of the printer>/icon/<icon file name>" can be used. The client computer 100 can acquire the local icon 602 by using e.g. the Get method of the HTTP with respect to this URL. Further, as part of the second information, the printer capability information is included. In the step S708, it is preferable to collectively transmit the local icon 602 and the printer capability information to the client computer 100. Incidentally, the disposition distance between the cloud print-supporting printer 202 and the client computer 100 generally tends to be shorter than the disposition distance between the cloud print-supporting printer 202 and the cloud print service 500. With this, even when the local icon 602 and the printer capability information are collectively transmitted, it is possible to perform relatively quick transmission regardless of the magnitude of the maximum communication speed between the cloud print-supporting printer 202 and the client computer 100. Note that in the step S708, transmission of the first information including the cloud icon 601 is inhibited. With this, it is possible to prevent the first information from being received by the client computer 100 and erroneously stored in the client computer 100 in the step S708. Note that in the step S708, not only the URL used for acquiring the icon image, but also the capability information of the cloud print-supporting printer 202 can be notified to the client computer 100. Then, after execution of the step S708, the present process is terminated.

As described above, the cloud print-supporting printer 202 can provide the icons dependent on the connection state to the cloud print service 500 and the client computer 100. Further, as described above, if it is determined in the step S707 that there is no printer capability information request, the present process is terminated. As a result, the second information is not transmitted to the client computer 100, and therefore, it is possible to prevent the second information from being wastefully stored e.g. in the client computer 100.

Figure 8:
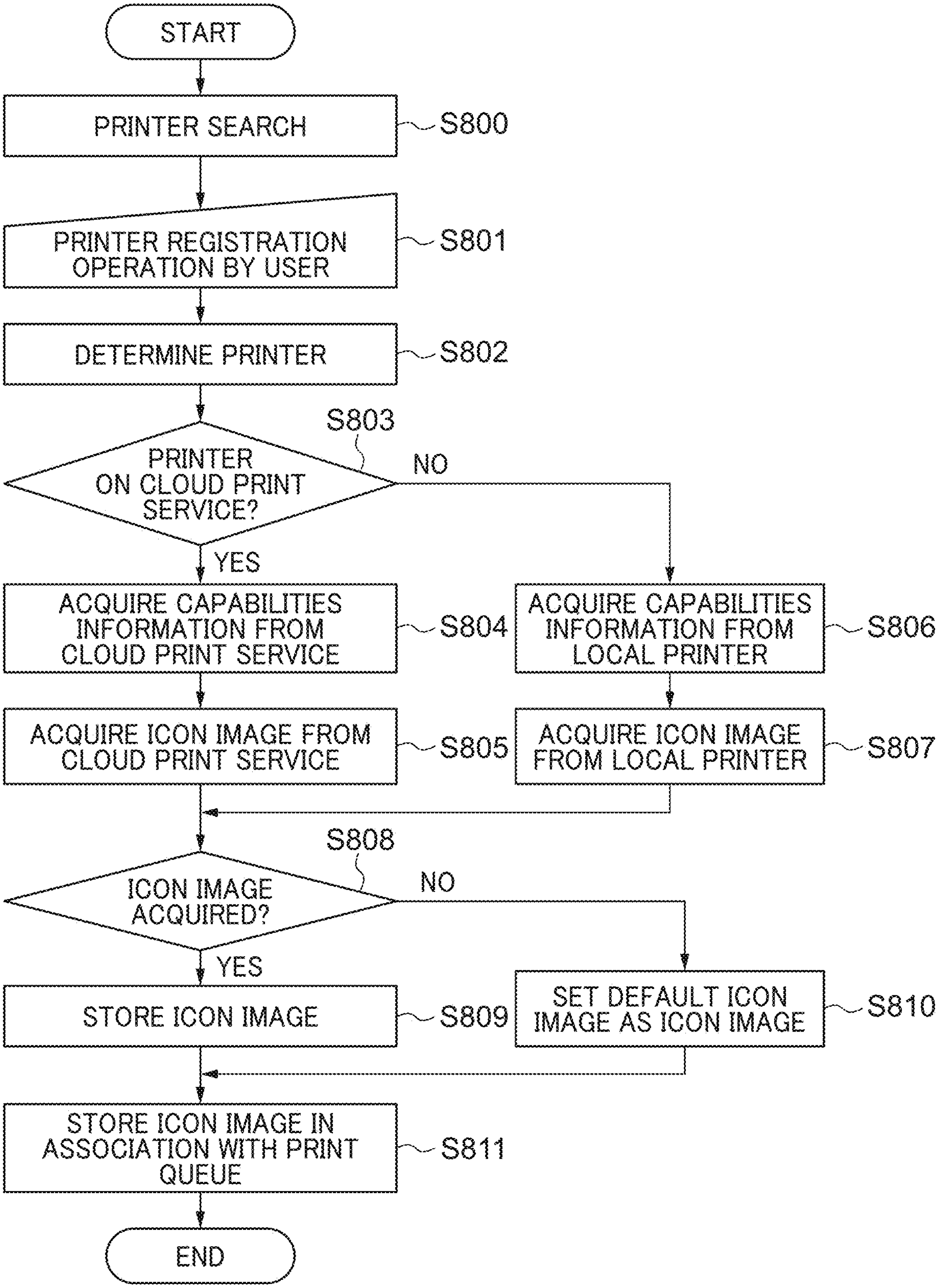
FIG. 8 is a flowchart of an icon acquisition process performed by the client computer.

FIG. 8 is a flowchart of an icon acquisition process performed by the client computer 100 to acquire icons. As shown in FIG. 8, in a step S800, the OS 1053 of the client computer 100 searches for cloud print-supporting printers 200 by using a predetermined protocol. This protocol is not particularly limited, but for example, Web Services for Devices (WSD), Internet Printing Protocol (IPP), or the like can be used. Then, the OS 1053 displays a list of the identification information of the cloud print-supporting printers 200 on the monitor 110 as a result of the search. Further, in a case where a valid account of the cloud print service 500 has been registered, the cloud print-supporting printers 200 which can be accessed are listed as tenants of the cloud print service 500 of this account.

In a step S801, the user 5000 performs the operation for registering the cloud print-supporting printers 200 listed in the step S800. Specifically, the user 5000 selects the identification information of the cloud print-supporting printer 200 to be registered in the OS 1053 from the information of the cloud print-supporting printers 200 listed in the step S800.

In a step S802, the OS 1053 generates a print queue based on the identification information of the cloud print-supporting printer 200 selected in the step S801. With this, the cloud print-supporting printer 200, an icon of which is to be acquired, is determined.

In a step S803, the OS 1053 determines whether or not the cloud print-supporting printer 200 determined in the step S802 is the cloud print-supporting printer 200 on the cloud print service 500, i.e. in the first connection state. If it is determined in the step S803 that the determined cloud print-supporting printer 200 is the cloud print-supporting printer 200 on the cloud print service 500, the process proceeds to a step S804. On the other hand, if it is determined in the step S803 that the determined cloud print-supporting printer 200 is not the cloud print-supporting printer 200 on the cloud print service 500, the process proceeds to a step S806.

In the step S804, the OS 1053 inquires the cloud print service 500 about the capability information of the cloud print-supporting printer 200 determined in the step S802. With this, the OS 1053 can acquire the capability information of the cloud print-supporting printer 200 from the cloud print service 500. Note that the capability information includes the URL of the storage storing the icon. Further, acquisition of the capability information is performed using the IPP operation "Get-Printer-Attributes". The IPP attribute set when using the IPP operation are determined by the OS 1053. In the present embodiment, the OS 1053 acquires the capability information using "Get-Printer-Attributes" to acquire the icon from the cloud print service 500. At this time, it is necessary to set the IPP attribute "printer-icons". Then, the OS 1053 can acquire the URL where the icon is stored, which is included in the capability information, from the cloud print service 500. Further, even when the explicit setting of the IPP attribute in "Get-Printer-Attribute" to acquire the capability information is omitted, it is possible to acquire the values of all IPP attributes by setting "all" therein.

In a step S805, the OS 1053 performs acquisition processing for acquiring the icon (icon image). Specifically, the OS 1053 transmits an HTTP Get request to the value of the URL of the IPP attribute "printer-icons", which is acquired in the step S804. With this, it is possible to attempt to acquire the cloud icon 601. Note that in a case where a plurality of URLs have been stored, the OS 1053 can attempt to acquire an icon a number of times which corresponds to the number of URLs. After execution of the step S805, the process proceeds to a step S808.

In the step S806 after execution of the step S803, the OS 1053 inquires a local printer existing in the same intranet as the client computer 100 about the capability information of the cloud print-supporting printer 200 determined in the step S802. With this, it is possible to acquire the capability information of the local printer. Similar to acquisition of the capability information in the step S804, the capability information mentioned here is acquired by using "Get-Printer-Attributes". At this time, the OS 1053 requests the attributes including the IPP attribute "printer-icons". Then, in a case where the value of the IPP attribute "Printer-icons" can be correctly acquired, this value indicates a path of the local icon group held by the local printer.

In a step S807, the OS 1053 performs acquisition processing for acquiring the icon (icon image). Specifically, similar to the step S805, the OS 1053 transmits an HTTP Get request to the value of the URL of the IPP attribute "printer-icons", which is acquired in the step S806. With this, it is possible to attempt to acquire the local icon 602. Note that in a case where a plurality of URLs have been stored, the OS 1053 can attempt to acquire an icon a number of times which corresponds to the number of URLs. After execution of the step S807, the process proceeds to the step S808.

In the step S808, the OS 1053 determines whether or not the cloud icon 601 attempted to acquire in the step S805 or the local icon 602 attempted to acquire in the step S807 has been successfully acquired. If it is determined in the step S808 that the icon has been successfully acquired, the process proceeds to a step S809. On the other hand, if it is determined in the step S808 that the icon has not successfully acquired, the process proceeds to a step S810. Note that even in a case where a valid URL has not been stored in the IPP attribute "printer-icons", the process also proceeds to the step S810.

In the step S809, the OS 1053 stores the file path of the storage so as to associate the icon acquired in the step S808 with the print queue. After execution of the step S809, the process proceeds to a step S811.

In the step S810, the OS 1053 stores the path of a default icon held so as to be associated with the print queue. Note that the default icon is an icon stored by the OS 1053 in advance. Further, in the step S810, the OS 1053 can change the icon according to a type of the cloud print-supporting printer 200, which is determined in the step S802. For example, in a case where the type of the cloud print-supporting printer 200, which is determined in the step S802, is the cloud printer, the icon can be changed to the icon formed by adding the image of the cloud to the normal icon of the cloud print-supporting printer 200. After execution of the step S810, the process proceeds to the step S811.

In the step S811, the OS 1053 stores the icon in a state associated with the print queue based on the printer name displayed in the step S800, the capability information acquired in the step S804 or S806, and the path of the icon, which is stored in the step S809 or the step S810. After execution of the step S811, the present process is terminated.

Figure 9:
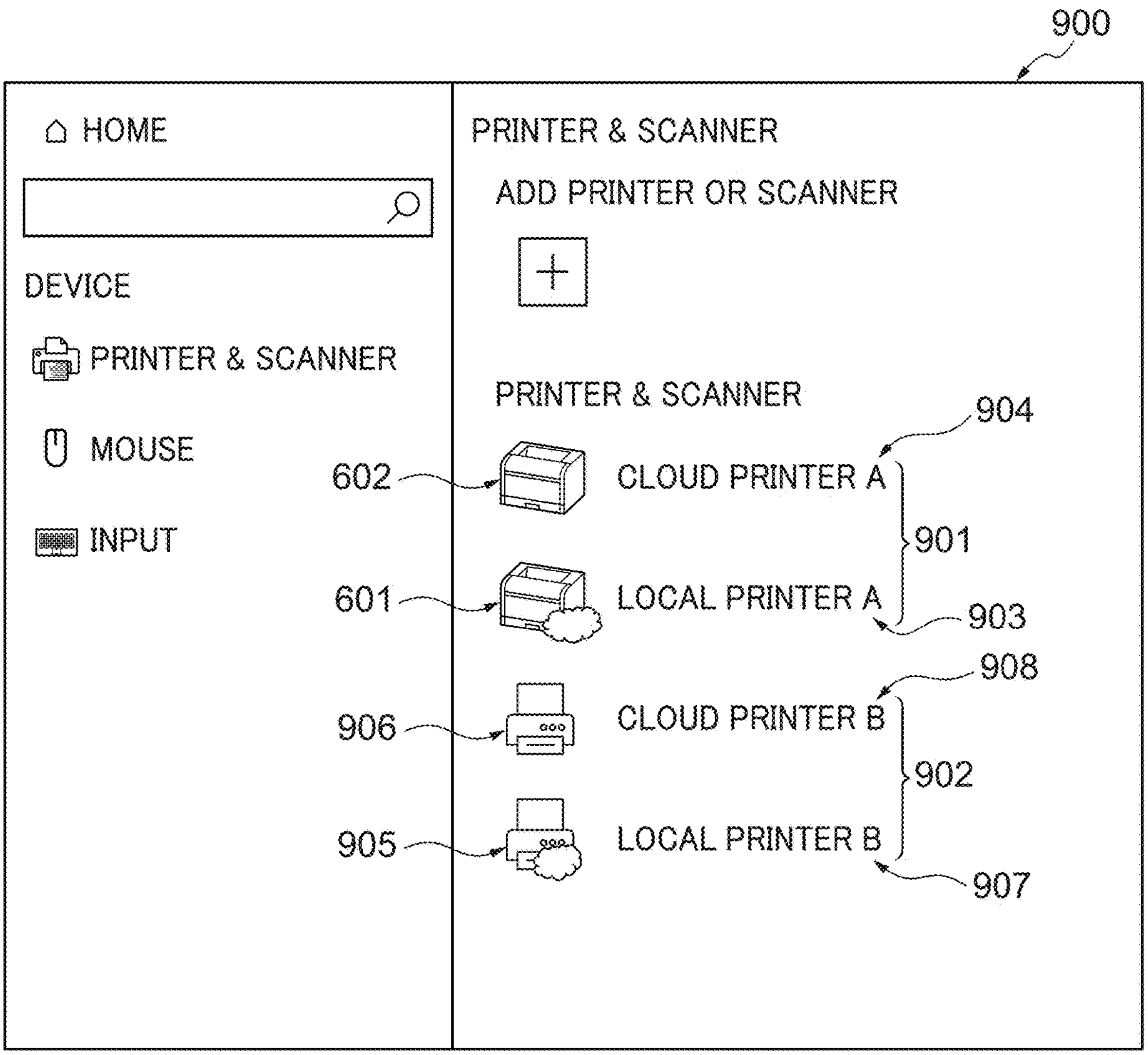
FIG. 9 is a diagram showing an example of a screen displayed on the client computer.

FIG. 9 is a diagram showing an example of a screen displayed on the client computer. A screen 900 shown in FIG. 9 is displayed on the monitor 110 of the client computer 100. On this screen 900, information 901 and information 902 are included. The information 901 includes the cloud icon 601 and the local icon 602, which are acquired by the icon acquisition process described above with reference to FIG. 8. The cloud icon 601 is an icon indicating the cloud print-supporting printer 200 connected to the client computer 100 via the cloud print service 500, i.e. in the first connection state. The local icon 602 is an icon indicating the cloud print-supporting printer 200 connected to the client computer 100 by local connection, i.e. in the second connection state. As described above, the cloud icon 601 and the local icon 602 are different in visual recognition. With this, when selecting one of the cloud icon 601 and the local icon 602, it is possible to easily distinguish which of the connection states of the cloud print-supporting printer 200 is indicated by each icon. For example, in a case where the user desires to set the cloud print-supporting printer 200 in the first connection state as the output destination, the user can select the cloud icon 601 without making a mistake. Further, in a case where the user desires to set the cloud print-supporting printer 200 in the second connection state as the output destination, the user can select the local icon 602 without making a mistake. Further, the information 901 includes a name 903 arranged adjacent to the cloud icon 601 and a name 904 arranged adjacent to the local icon 602. The name 903 is "cloud printer A" which is the name of the cloud print-supporting printer 200 in the first connection state. The name 904 is "local printer A" which is the name of the cloud print-supporting printer 200 in the second connection state. The name 903 and the name 904 make it possible to more positively distinguish the cloud icon 601 and the local icon 602.

The information 902 includes a cloud icon 905, a local icon 906, a name 907, and a name 908. Here, let it be assumed that the printing system 1000 has a cloud print-supporting printer different from the cloud print-supporting printer 200 (hereinafter referred to as the "other cloud print-supporting printer"). In a case where the other cloud print-supporting printer in the first connection state does not hold an icon indicating this printer, the cloud icon 905 is displayed as the default in place of this icon. In a case where the other cloud print-supporting printer in the second connection state does not hold an icon indicating the printer, the local icon 906 is displayed as the default in place of the icon. The cloud icon 905 and the local icon 906 are different in visual recognition. With this, when selecting one of the cloud icon 905 and the local icon 906, it is possible to easily distinguish which of the connection states of the other cloud print-supporting printer is indicated by each icon. For example, in a case where the user desires to set the other cloud print-supporting printer in the first connection state as the output destination, the user can select the cloud icon 905 without making a mistake. Further, in a case where the user desires to set the other cloud print-supporting printer in the second connection state as the output destination, the user can select the local icon 906 without making a mistake. Further, let us compare a difference in visual recognition between the cloud icon 905 and the local icon 906, and a difference in visual recognition between the cloud icon 601 and the local icon 602, with each other. In this case, it is possible to more easily distinguish the icons in the latter case than in the former case. The name 907 is arranged adjacent to the cloud icon 905. The name 907 is "cloud printer B" which is the name of the other cloud print-supporting printer in the first connection state. The name 908 is arranged adjacent to the local icon 906. The name 908 is "local printer B" which is the name of the other cloud print-supporting printer in the second connection state.

Figure 10:
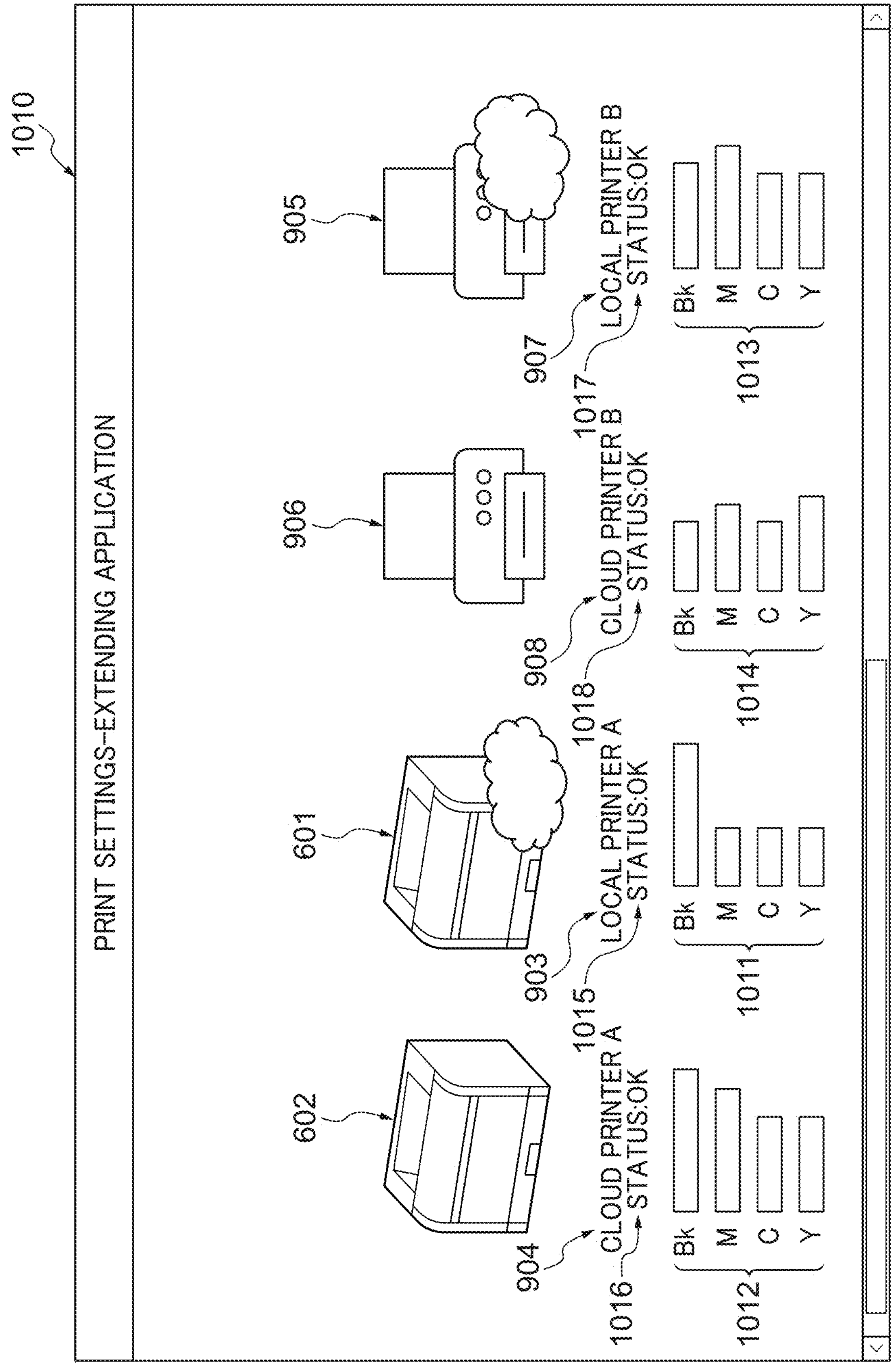
FIG. 10 is a diagram showing an example (variation) of the screen displayed on the client computer.

Further, in a case where an icon acquisition request is received from the print setting-extending application 1052 with respect to the icon acquired by the icon acquisition process described with reference to FIG. 8, the OS 1053 can respond to this request. Then, the print setting-extending application 1052 can store the print queue and the icon in the local area of the print setting-extending application 1052, in a state associated with each other. This "local area" refers to a storage area where reading and writing can be performed by the print setting-extending application 1052. The icons stored in the local area are displayed on a printer information screen for displaying the printer information managed by the print setting-extending application 1052. FIG. 10 is a diagram showing an example (variation) of the screen displayed on the client computer. A screen 1010 shown in FIG. 10 is the printer information screen. This screen 1010 is displayed by selecting the print setting-extending application 1052 on a screen that displays a list of applications installed in the client computer 100. On the screen 1010, printers associated with the print setting-extending application 1052 are displayed in a list.

The screen 1010 includes the cloud icon 601 and the name 903, which are associated with the cloud print-supporting printer 200 in the first connection state, and the local icon 602 and the name 904, which are associated with the cloud print-supporting printer 200 in the second connection state. Further, the screen 1010 includes the cloud icon 905 and the name 907, which are associated with the other cloud print-supporting printer in the first connection state, and the local icon 906 and the name 908, which are associated with the other cloud print-supporting printer in the second connection state. Further, the screen 1010 includes ink/toner remaining amount information 1011, ink/toner remaining amount information 1012, ink/toner remaining amount information 1013, and ink/toner remaining amount information 1014. The screen 1010 includes status information 1015, status information 1016, status information 1017, and status information 1018.

The ink/toner remaining amount information 1011 is information included in the first information and indicates a remaining amount of ink or toner at the time of transmission of the first information from the cloud print-supporting printer 200 in the first connection state. The status information 1015 is information included in the first information and indicates a status at the time of transmission of the first information from the cloud print-supporting printer 200 in the first connection state. The ink/toner remaining amount information 1012 is information included in the second information and indicates a remaining amount of ink or toner at the time of transmission of the second information from the cloud print-supporting printer 200 in the second connection state. The status information 1016 is information included in the second information and indicates a status at the time of transmission of the second information from the cloud print-supporting printer 200 in the second connection state. The ink/toner remaining amount information 1013 is information included in the first information and indicates a remaining amount of ink or toner at the time of transmission of the first information from the other cloud print-supporting printer in the first connection state. The status information 1017 is information included in the first information and indicates a status at the time of transmission of the first information from the other cloud print-supporting printer in the first connection state. The ink/toner remaining amount information 1014 is information included in the second information and indicates a remaining amount of ink or toner at the time of transmission of the second information from the other cloud print-supporting printer in the second connection state. The status information 1018 is information included in the second information and indicates a status at the time of transmission of the second information from the other cloud print-supporting printer in the second connection state. With the remaining amount information and status information described above, it is possible to confirm (grasp) the remaining amount of ink or toner and the status of each printer.

Figure 11:
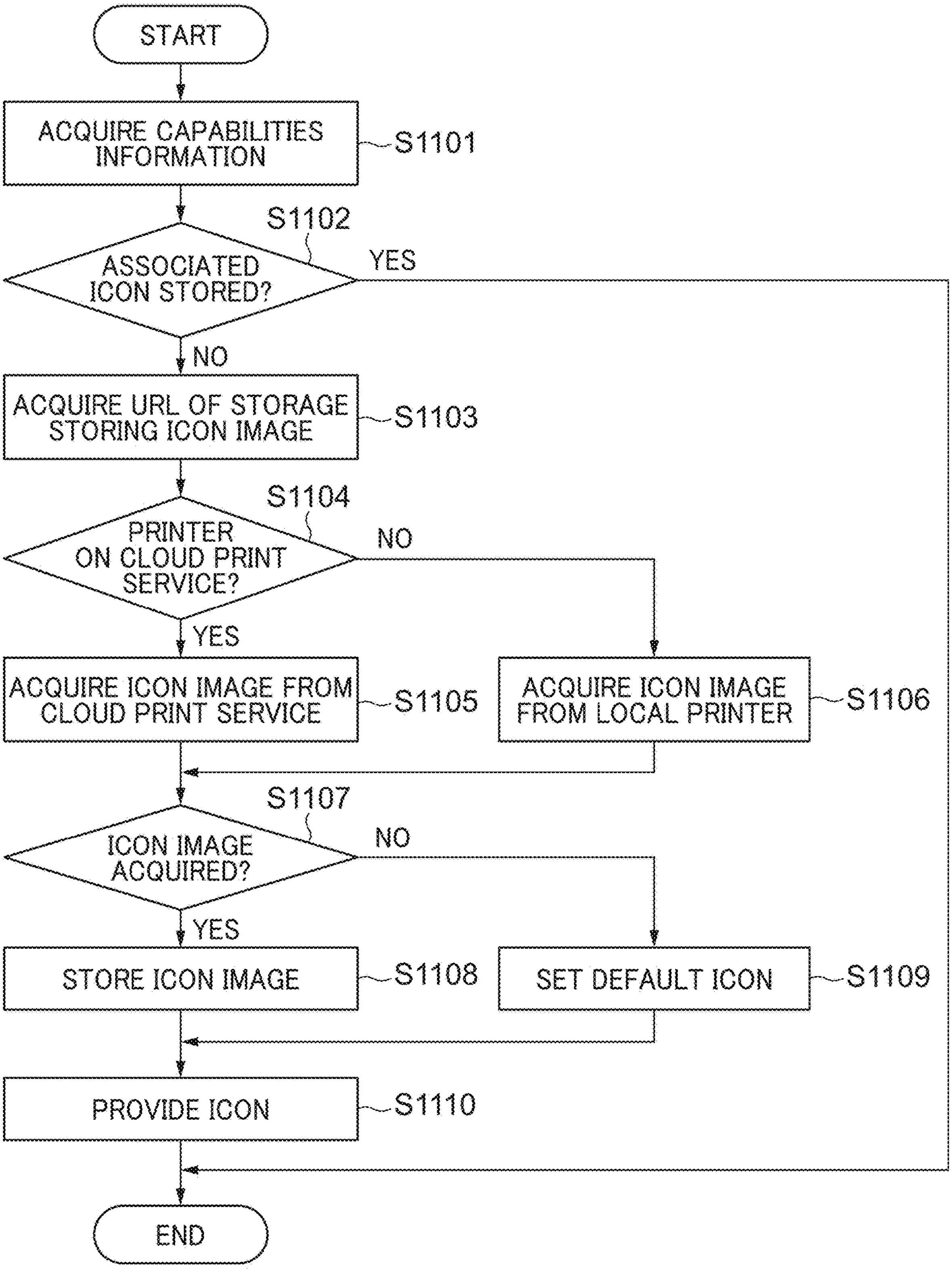
FIG. 11 is a flowchart of an icon acquisition process performed by a client computer according to a second embodiment.
Figure 12:
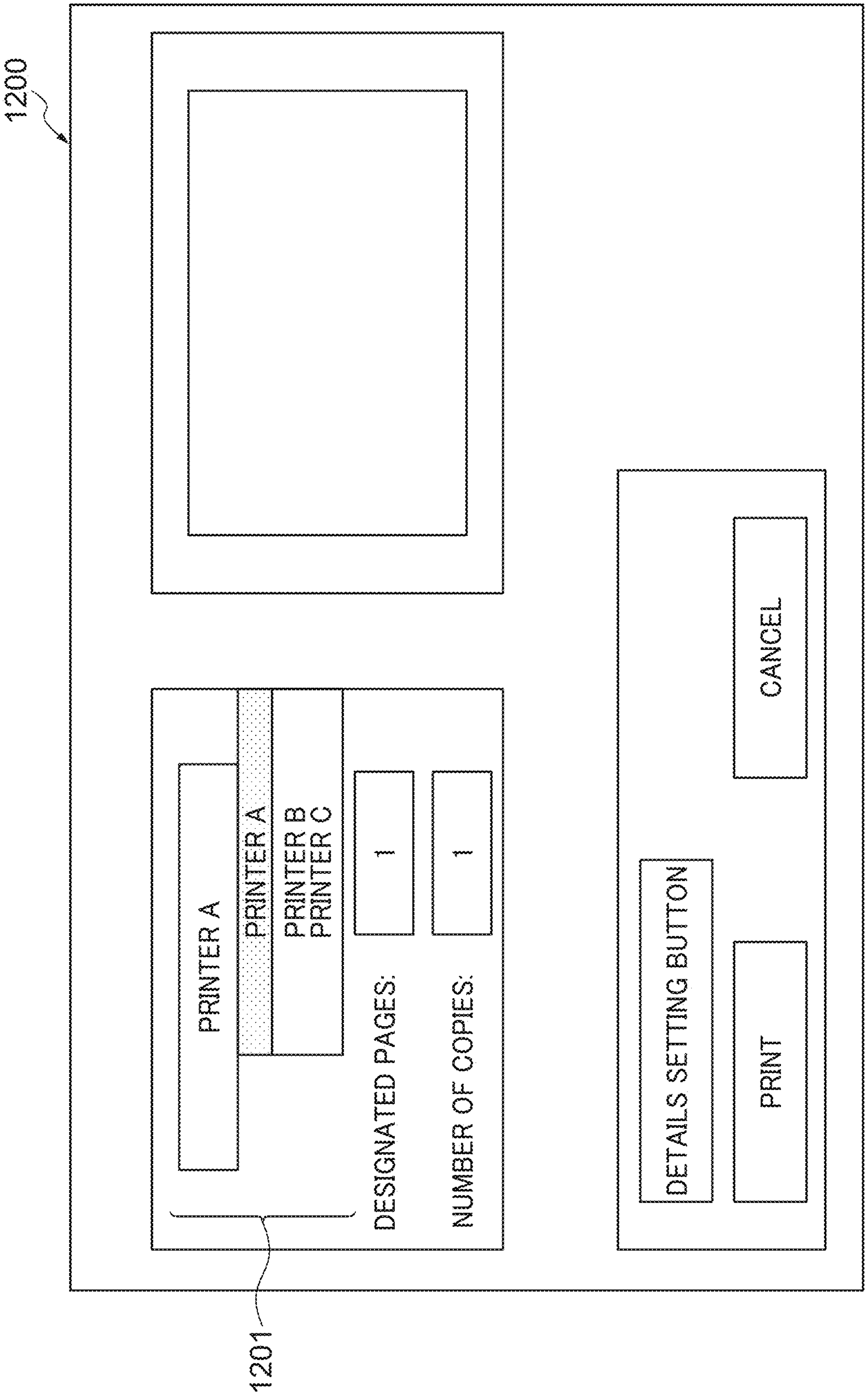
FIG. 12 is a diagram showing an example of a screen displayed on the client computer.

Hereafter, a second embodiment will be described with reference to FIGS. 11 to 13, but the description will be given mainly of different points from the above-described first embodiment, and description of the same points is omitted. In the first embodiment, the icons acquired by the OS 1053 are displayed, and further, in a case where an icon acquisition request is received from the print setting-extending application 1052, the icons are displayed on the printer information screen (screen 1010) managed by the print setting-extending application 1052. In the present embodiment, a configuration will be described in which icons acquired by the print setting-extending application 1052 are displayed on the printer information screen and icons acquired by the OS 1053 are further displayed. FIG. 11 is a flowchart of an icon acquisition process performed by the print setting-extending application 1052 of the client computer 100 to acquire icons. FIG. 12 is a diagram showing an example of a screen displayed on the client computer. A screen 1200 shown in FIG. 12 is a print dialog displayed on the monitor 110 by the control of the OS 1053 when data generated on the application 1051 of the client computer 100 is printed. The screen 1200 includes a list box 1201. It is possible to select one printer from a plurality of printers displayed in the list box 1201. FIG. 12 shows a state, by way of example, in which "printer A", "printer B", and "printer C" are displayed in the list box 1201, and the "printer A" is selected from them. Further, the icon acquisition process in FIG. 11 is started when one printer is selected from the list box 1201, and the OS 1053 calls the print setting-extending application 1052.

As shown in FIG. 11, in a step S1101, the print setting-extending application 1052 acquires the printer capability information from the cloud print service 500. Processing for the capability information acquisition is executed when the print setting-extending application 1052 transmits a request for acquiring the printer capability information to the cloud print service 500 using an application programming interface (API) provided by the OS 1053. Specifically, the print setting-extending application 1052 acquires the capability information indicated in the list box 1201 (see FIG. 12) from the cloud print service 500, using "Get-Printer-Attributes" defined by the IPP. Note that the printer capability information can include unique information which is not defined by the IPP.

In a step S1102, the print setting-extending application 1052 determines whether or not an icon associated with the printer selected form the list box 1201 has already been stored, that is, the corresponding icon exists. This determination processing is executed based on whether or not the print setting-extending application 1052 has stored an icon associated with the print queue of the printer selected form the list box 1201. In a case where an icon image associated with the print queue has been stored, or in a case where the default icon image has been stored as the icon image associated with the print queue, it is determined that the corresponding icon has already been stored. Then, if it is determined in the step S1102 that the corresponding icon has already been stored, the present process is terminated. On the other hand, if it is determined in the step S1102 that the corresponding icon has not been stored, the process proceeds to a step S1103.

In the step S1103, the print setting-extending application 1052 acquires the URL of the storage storing the icon associated with the cloud print-supporting printer 200 using the API provided by the OS 1053. In a case where the cloud print-supporting printer 200 is a cloud printer, the OS 1053 transmits the IPP operation "Get-Printer-Attributes" to the cloud print service 500. At this time, as an argument of this operation, the IPP attribute "printer-icons" is set. With this, it is possible to request the value of the IPP attribute "printer-icons" to the cloud print service 500. The cloud print service 500 having received the capability acquisition request transmits the value of the IPP attribute "printer-icons" of the cloud print-supporting printer 200 to the client computer 100. On the other hand, in a case where the cloud print-supporting printer 200 is a local printer, the value of the IPP attribute "printer-icons" for the local printer is acquired.

In a step 1104, the print setting-extending application 1052 determines whether or not the printer selected from the list box 1201 is a cloud print-supporting printer 200 on the cloud print service 500. This determination processing is executed based on whether the driver of the printer selected from the list box 1201 is the cloud printer driver 1057 or the IPP standard driver 1058. In a case where the printer driver is the cloud printer driver 1057, it is determined that the printer selected from the list box 1201 is a cloud print-supporting printer 200 on the cloud print service 500. In a case where the printer driver is the IPP standard driver 1058, it is determined that the printer selected from the list box 1201 is not a cloud print-supporting printer 200 on the cloud print service 500. Then, if it is determined in the step S1104 that the selected printer is a cloud print-supporting printer 200 on the cloud print service 500, the process proceeds to a step S1105. On the other hand, if it is determined in the step S1104 that the selected printer is not a cloud print-supporting printer 200 on the cloud print service 500, the process proceeds to a step S1106.

In the step S1105, the print setting-extending application 1052 transmits an HTTP Get request to the URL which is the value of the IPP attribute "printer-icons" acquired in the step S1103. With this, the cloud print service 500 can receive this Get request. Then, the cloud print service 500 transmits the cloud icon 601 stored in the URL to the print setting-extending application 1052. With this, it is possible to acquire the cloud icon 601 from the cloud print service 500. After execution of the step S1105, the process proceeds to a step S1107.

In the step S1106, the print setting-extending application 1052 transmits a request for acquiring the local icon 602 to the URL which is the value of the IPP attribute "printer-icons" acquired in the step S1103. With this, it is possible to acquire the local icon 602 from the local printer. After execution of the step S1106, the process proceeds to the step S1107.

In the step S1107, the print setting-extending application 1052 determines whether or not the icon has been successfully acquired (received) in the step S1105 or the step S1106. If it is determined in the step S1107 that the icon has been successfully acquired, the process proceeds to a step S1108. On the other hand, if it is determined in the step S1107 that the icon has not been successfully acquired, the process proceeds to a step S1109.

In the step S1108, the print setting-extending application 1052 stores the icon acquired in the step S1105 or the step S1106 in the local area of the print setting-extending application 1052 in a state associated with the printer selected in the step S1102. After execution of the step S1108, the process proceeds to a step S1110.

In the step S1109, the print setting-extending application 1052 stores the default icon which is an icon of a general printer, stored in the local area, as the icon of the selected printer. With this, even if acquisition of the icon has failed, it is possible to display the icon provided by the print setting-extending application 1052. After execution of the step S1109, the process proceeds to the step S1110.

In the step S1110, the print setting-extending application 1052 provides the icon acquired by the processing operations so far to the OS 1053. With this, the OS 1053 can store the icon in a state associated with the print queue of the printer selected in the step S1102. Further, the OS 1053 stores the icon in the storage area of the OS 1053. This "storage area" is an area which can be referred to by the OS 1053 but cannot be referred to by the print setting-extending application 1052. After execution of the step S1110, the present process is terminated.

With the above-described process, the print setting-extending application 1052 can display the screen 1010 shown in FIG. 10. Further, the print setting-extending application 1052 provides the acquired icon to the OS 1053 in the step S1110. With this, it is possible to display the screen 900 shown in FIG. 9. Then, on both of the screen 1010 and the screen 900, it is possible to easily distinguish the cloud icon 601 and the local icon 602.

The icon image acquisition process in FIG. 11 is executed by the print setting-extending application 105, when the printer is selected. The timing of executing the icon image acquisition process is not limited to the timing when the printer is selected, but for example, the process can be executed when the user 5000 starts the print setting-extending application 1052. Here, execution of the icon image acquisition process at the timing when the print setting-extending application 1052 is started will be described. The icon image acquisition process in FIG. 13 is started when the user 5000 opens the print setting-extending application 1052, and the OS 1053 provides a start instruction to the print setting-extending application 1052.

Figure 13:
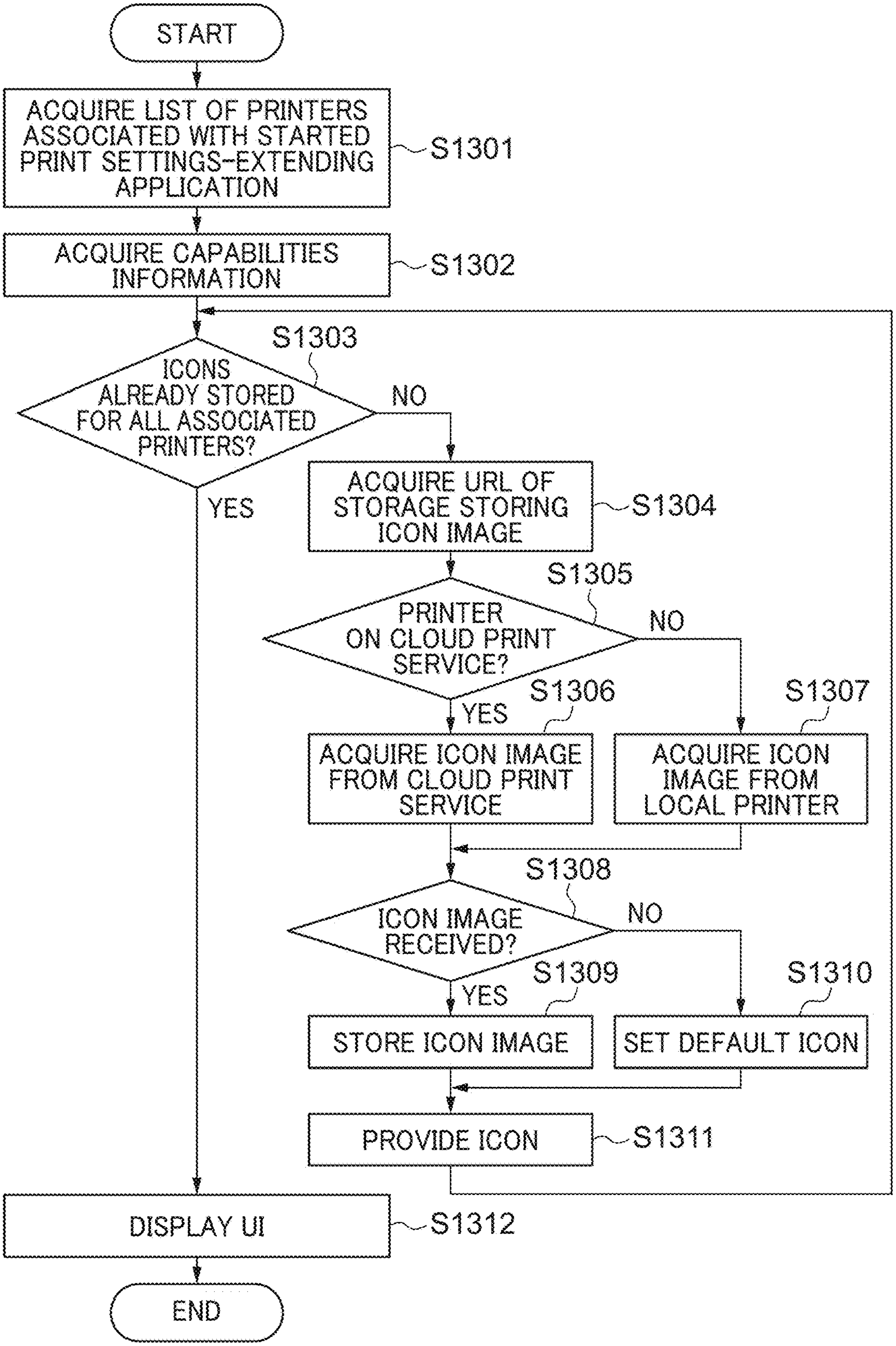
FIG. 13 is a flowchart of a variation of the process performed by the client computer.

As shown in FIG. 13, in a step S1301, the print setting-extending application 1052 acquires a list of printers associated with the print setting-extending application 1052. Specifically, the print setting-extending application 1052 acquires information of the print queue managed by the OS 1053. Then, the print setting-extending application 1052 determines whether or not a value of "package family name" stored in the property of the print queue is the same as a value of "package family name" stored by the print setting-extending application 1052. The "package family name" is identification information of the application. The OS 1053 can call the application associated with the print queue selected by the user by storing the print queue and the identification information of the application in a state associated with each other. The print setting-extending application 1052 can identify the print queue associated with the print setting-extending application 1052 by referring to the value of "device package family name" of each print queue. Note that in the step S1301, the list of printers can be acquired by using the API provided by the OS 1053 when the print setting-extending application 1052 is opened.

In a step S1302, the print setting-extending application 1052 acquires capability information with respect to respective print queues of the printer list acquired in the step S1301.

In a step S1303, the print setting-extending application 1052 determines, with respect to each print queue of the printer list acquired in the step S1301, whether or not an icon associated with the print queue has already been stored. Specifically, the print setting-extending application 1052 refers to the model name and the HWID, which are associated with the print queue, and determines whether or not an icon has been stored in the local area of the print setting-extending application 1052. If it is determined in the step S1303 that the icons associated with the respective print queues have been stored, the process proceeds to a step S1312. On the other hand, if it is determined in the step S1303 that there is any print queue, an associated icon of which has not been stored, the process proceeds to a step S1304.

In the step S1304, the print setting-extending application 1052 selects one print queue, an associated icon of which has not been stored. Then, the print setting-extending application 1052 transmits a request for acquiring a URL of a storage storing the icon associated with the selected print queue, using the API provided by the OS 1053. Note that the command used in the step S1304 is the same as that used in the step S1103. Further, the cloud print service 500 receives the URL acquisition request from the print setting-extending application 1052 and transmits the URL. With this, the print setting-extending application 1052 can receive the URL of the storage storing the icon from the cloud print service 500. Note that the print setting-extending application 1052 can also receive the URL of the storage storing the icon from the local printer having received the above-mentioned acquisition request.

In a step S1305, the print setting-extending application 1052 determines whether or not the printer associated with the print queue selected in the step S1304 is a cloud print-supporting printer 200 on the cloud print service 500. If it is determined in the step S1305 that the printer is a cloud print-supporting printer 200 on the cloud print service 500, the process proceeds to a step S1306. On the other hand, if it is determined in the step S1305 that the printer is not a cloud print-supporting printer 200 on the cloud print service 500, the process proceeds to a step S1307.

In the step S1306, the print setting-extending application 1052 acquires the cloud icon 601 from the cloud print service 500 using the URL received in the step S1304.

In the step S1307, the print setting-extending application 1052 acquires the local icon 602 from the local printer using the URL received in the step S1304.

In a step S1308, the print setting-extending application 1052 determines whether or not the icon has been successfully acquired in the step S1306 or the step S1307. If it is determined in the step S1308 that the icon has been successfully acquired, the process proceeds to a step S1309. On the other hand, if it is determined in the step S1308 that the icon has not been successfully acquired, the process proceeds to a step S1310.

In the step S1309, the print setting-extending application 1052 stores the icon acquired in the step S1306 or the step S1307 in the local area of the print setting-extending application 1052 in a state associated with the print queue selected in the step S1304.

In the step S1310, the print setting-extending application 1052 stores the default icon in the local area of the print setting-extending application 1052 in a state associated with the selected print queue based on the HWID or Compatible ID (COID) associated with the selected print queue.

In a step S1311, the print setting-extending application 1052 provides the icon acquired in the above-described processing operations so far to the OS 1053. With this, the OS 1053 can receive the icon and store the received icon in a state associated with the print queue associated with the printer, which has been selected in the step S1304. Further, the OS 1053 stores the icon in the storage area of the OS 1053. After execution of the step S1311, the process returns to the step S1303, and the step S1303 et seq. are sequentially executed. Further, by repeating the steps S1304 to S1311, it is possible to store the icons with respect to all of the print queues associated with the print setting-extending application 1052.

In the step S1312 after execution of the step S1303, the print setting-extending application 1052 displays the screen 1010, i.e. the user interface (UI), shown in FIG. 10. As described above, on the screen 1010, it is possible to easily distinguish the cloud icon 601 and the local icon 602. Note that as the timing of executing the icon image acquisition process, it is possible to combine the timing of selecting a printer and the timing of starting the print setting-extending application 1052.

Figure 14:
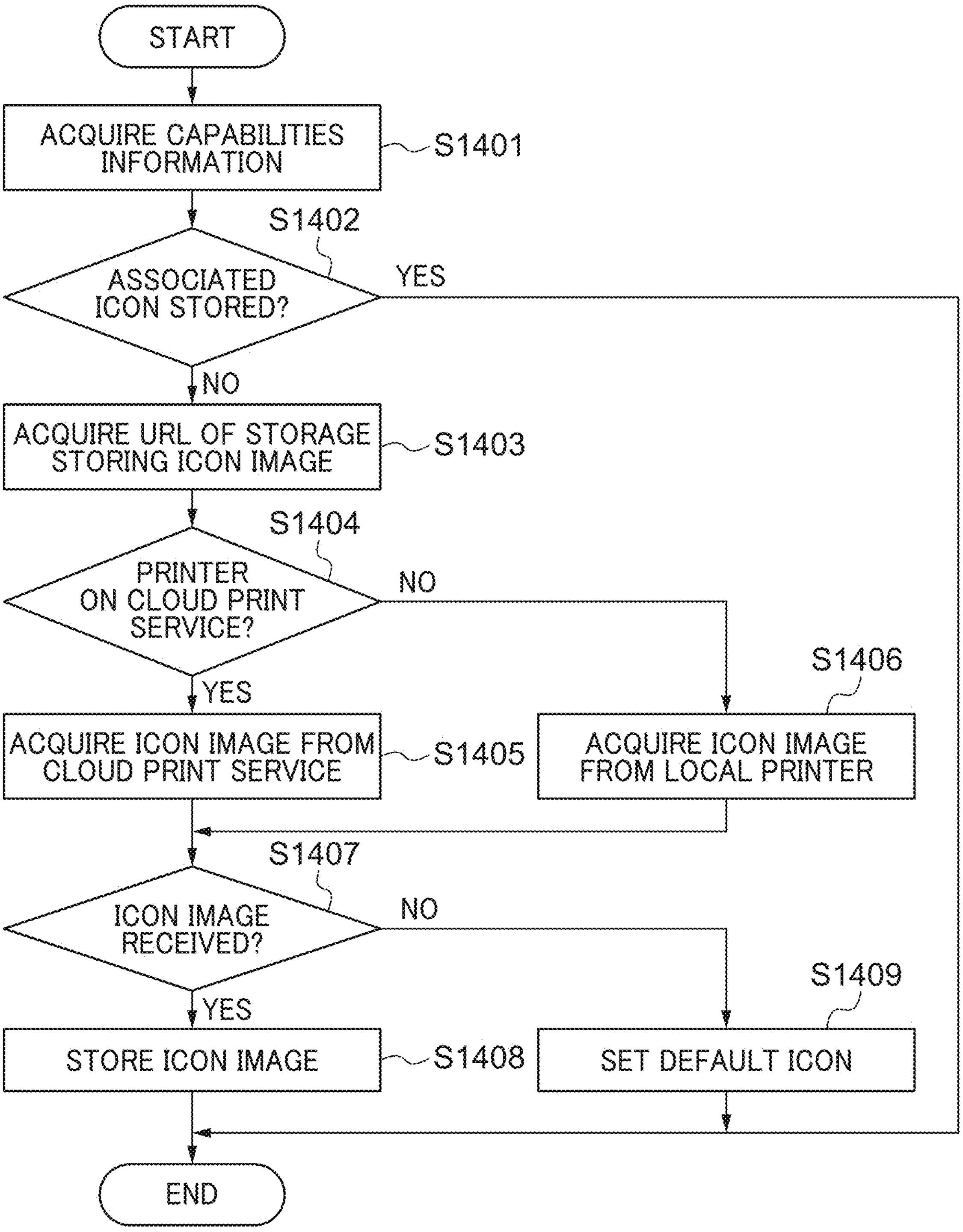
FIG. 14 is a flowchart of a process performed by a client computer according to a third embodiment.
Figure 15:
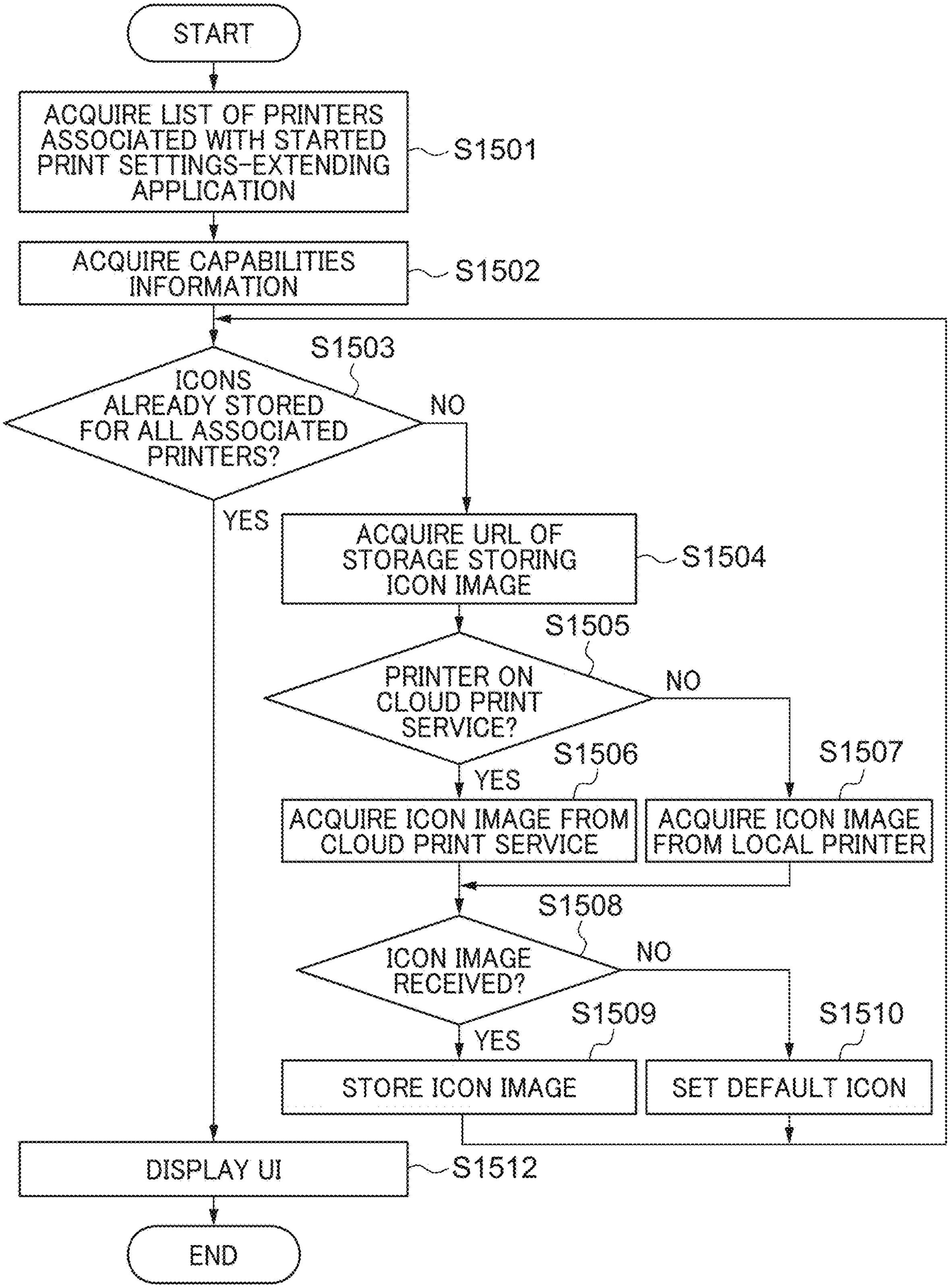
FIG. 15 is a flowchart of a variation of the process performed by the client computer.

Hereafter, a third embodiment will be described with reference to FIGS. 14 and 15, but the description will be given mainly of different points from the above-described first and second embodiments, and description of the same points is omitted. In the present embodiment, a configuration will be described in which the OS 1053 and the print setting-extending application 1052 acquire icons to hold the security of the printing system 1000. In the present embodiment, the OS 1053 acquires an icon from the local printer or the cloud print service 500 when generating a print queue on the client computer 100. This acquisition process has been described with reference to FIG. 8, and hence description here is omitted. Note that in the present embodiment, since the OS 1053 and the print setting-extending application 1052 acquire icons, differently from the first embodiment, an icon acquisition request is not transmitted from the print setting-extending application 1052. The print setting-extending application 1052 acquires an icon at the following two timings: The first timing is a time at which a printer is selected by using an application different from the print setting-extending application 1052. The second timing is a time at which print setting-extending application 1052 is started by being selected on the screen of the list of applications stored in the client computer 100.

First, the icon acquisition process at the first timing will be described with reference to FIG. 14. FIG. 14 is a flowchart of the icon acquisition process performed by the client computer according to the third embodiment. Steps S1401 to S1409 of the icon acquisition process in FIG. 14 are the same as the steps S1101 to S1109 of the icon acquisition process in FIG. 11. Further, the step S1110 of the icon acquisition process in FIG. 11, i.e. the processing in which the print setting-extending application 1052 provides an icon to the OS 1053 is omitted from the icon acquisition process in FIG. 14.

Next, the icon acquisition process at the second timing will be described with reference to FIG. 15. FIG. 15 is a flowchart of a variation of the icon acquisition process performed by the client computer. Steps S1501 to S1510 and S1512 of the icon acquisition process in FIG. 15 are the same as the steps S1301 to S1310 and S1312 of the icon acquisition process in FIG. 13. Further, omitted from the icon acquisition process in FIG. 15 is the processing corresponding to the step S1311 of the icon acquisition process FIG. 13, i.e. the processing in which the print setting-extending application 1052 provides an icon acquired in the processing operations so far to the OS 1053.

As described above, the OS 1053 acquires icons from the local printer or the cloud print service 500 when generating a print queue on the client computer 100. This makes it possible to omit the processing in which the print setting-extending application 1052 provides icons to the OS 1053. Further, in the present embodiment, the OS 1053 and the print setting-extending application 1052 can acquire icons. With this, on both of the screens provided by the print setting-extending application 1052 and the screen provided by the OS 1053, the cloud icon 601 and the local icon 602, which can be visually distinguished from each other, are displayed. Note that the print setting-extending application 1052 can be enabled to acquire icons only at one of the above-mentioned two timings. That is, icons can be acquired only at the first timing or only at the second timing.

Figure 16:
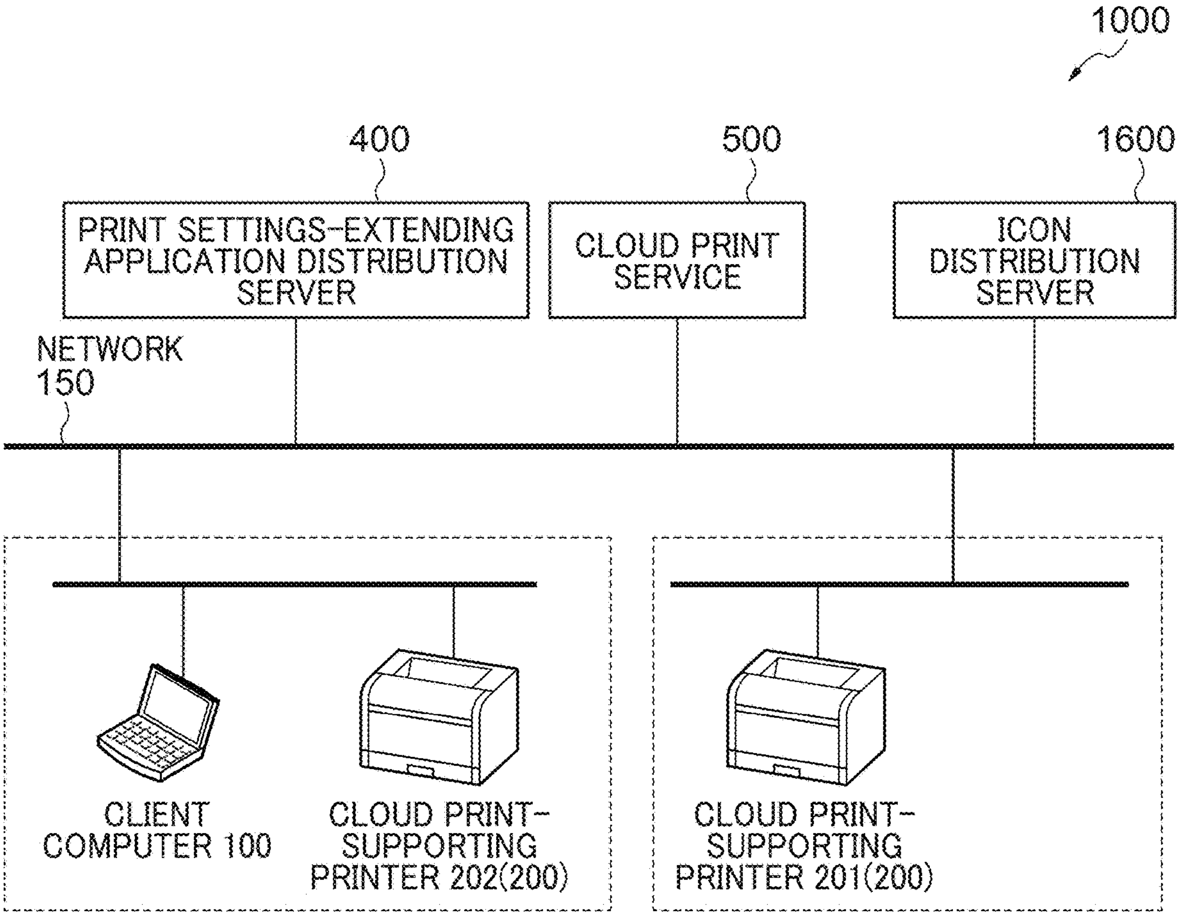
FIG. 16 is a diagram schematically showing a configuration of a printing system according to a fourth embodiment.

Hereafter, a fourth embodiment will be described with reference to FIGS. 16 to 18, but the description will be given mainly of different points from the above-described first to third embodiments, and description of the same points is omitted. In the present embodiment, a configuration will be described in which the cloud icon 601 and the local icon 602 are acquired from an icon distribution server 1600. FIG. 16 is a diagram schematically showing a configuration of the printing system according to the fourth embodiment. As shown in FIG. 16, in the present embodiment, the printing system 1000 further includes the icon distribution server 1600 communicably connected via the network 150. The icon distribution server 1600 is a server that transmits, in a case where an icon acquisition request is received from the client computer 100, icons corresponding to this request, to the client computer 100. In the present embodiment, the print setting-extending application 1052 acquires icons from the icon distribution server 1600. The print setting-extending application 1052 acquires icons at the following two timings: The first timing is a time at which a printer is selected by using an application different from the print setting-extending application 1052. The second timing is a time at which the print setting-extending application 1052 is started by being selected on the screen of the list of applications stored in the client computer 100.

First, the icon acquisition process at the first timing will be described with reference to FIG. 17. FIG. 17 is a flowchart of the icon acquisition process performed by the client computer according to the fourth embodiment. Steps S1701 and S1702 of the icon acquisition process in FIG. 17 are the same as the steps S1101 and S1102 of the icon acquisition process in FIG. 11. Then, if it is determined in the step S1702 that the corresponding icon has already been stored, the present process is terminated. On the other hand, if it is determined in the step S1702 that the corresponding icon has not been stored, the process proceeds to a step S1703.

In the step S1703, the print setting-extending application 1052 determines whether or not the printer selected form the list box 1201 is a cloud print-supporting printer 200 on the cloud print service 500. Then, if it is determined in the step S1703 that the selected printer is a cloud print-supporting printer 200 on the cloud print service 500, the process proceeds to a step S1704. On the other hand, if it is determined in the step S1703 that the selected printer is not a cloud print-supporting printer 200 on the cloud print service 500, the process proceeds to a step S1705.

In the step S1704, the print setting-extending application 1052 transmits a request for acquiring the cloud icon 601 to the icon distribution server 1600. Specifically, the print setting-extending application 1052 inquires the icon distribution server 1600 about information concerning the model name and the first connection state of the cloud print-supporting printer 200 determined in the step S1703 using the HTTP Get method. Then, in a case where the cloud icon 601 indicating the cloud print-supporting printer 200 has been stored, the icon distribution server 1600 transmits the cloud icon 601 to the client computer 100. With this, the print setting-extending application 1052 can acquire the cloud icon 601 from the icon distribution server 1600. After execution of the step S1704, the process proceeds to a step S1706.

In the step S1705, the print setting-extending application 1052 transmits a request for acquiring the local icon 602 to the icon distribution server 1600. Specifically, the print setting-extending application 1052 inquires the icon distribution server 1600 about information concerning the second connection state. Then, in a case where the local icon 602 indicating the corresponding cloud print-supporting printer 200 has been stored, the icon distribution server 1600 transmits the local icon 602 to the client computer 100. With this, the print setting-extending application 1052 can acquire the local icon 602 from the icon distribution server 1600. After execution of the step S1705, the process proceeds to the step S1706.

In the step S1706, the print setting-extending application 1052 determines whether or not the icon has been successfully acquired in the step S1704 or the step S1705. If it is determined in the step S1706 that the icon has been successfully acquired, the process proceeds to a step S1707. On the other hand, if it is determined in the step S1706 that the icon has not been successfully acquired, the process proceeds to a step S1708.

In the step S1707, the print setting-extending application 1052 stores the icon acquired in the step S1704 or the step S1705 in the local area of the print setting-extending application 1052 in a state associated with the printer selected in the step S1702. After execution of the step S107, the process proceeds to a step S1709.

In the step S1708, the print setting-extending application 1052 stores the default icon which is an icon of a general printer, which is stored in the local area, as the icon of the selected printer. After execution of the step S1708, the process proceeds to the step S1709.

In the step S1709, the print setting-extending application 1052 provides the icon acquired by the processing operations so far to the OS 1053. With this, the OS 1053 stores the icon in the storage area of the OS 1053 in a state associated with the print queue associated with the printer selected in the step S1702. With the above-described process, the cloud icon 601 or the local icon 602 is stored in both of the local area of the print setting-extending application 1052 and the storage area of the OS 1053.

Next, the icon acquisition process at the second timing will be described with reference to FIG. 18. FIG. 18 is a flowchart of a variation of the icon acquisition process performed by the client computer. Steps S1801 to S1803 of the icon acquisition process in FIG. 18 are the same as the steps S1301 to S1303 of the icon acquisition process in FIG. 13. Then, if it is determined in the step S1803 that the icons associated with the respective print queues have been stored, the process proceeds to a step S1812. Note that the step S1812 is the same as the step S1312 of the icon acquisition process in FIG. 13. On the other hand, if it is determined in the step S1803 that there is a print queue, an associated icon of which has not been stored, the process proceeds to a step S1804.

In the step S1804, the print setting-extending application 1052 selects one print queue, an associated icon of which has not been stored, and determines whether or not the printer associated with the print queue is a cloud print-supporting printer 200 on the cloud print service 500. Then, if it is determined in the step S1804 that the printer is a cloud print-supporting printer 200 on the cloud print service 500, the process proceeds to a step S1805. On the other hand, if it is determined in the step S1804 that the printer is not a cloud print-supporting printer 200 on the cloud print service 500, the process proceeds to a step S1806.

Figure 17:
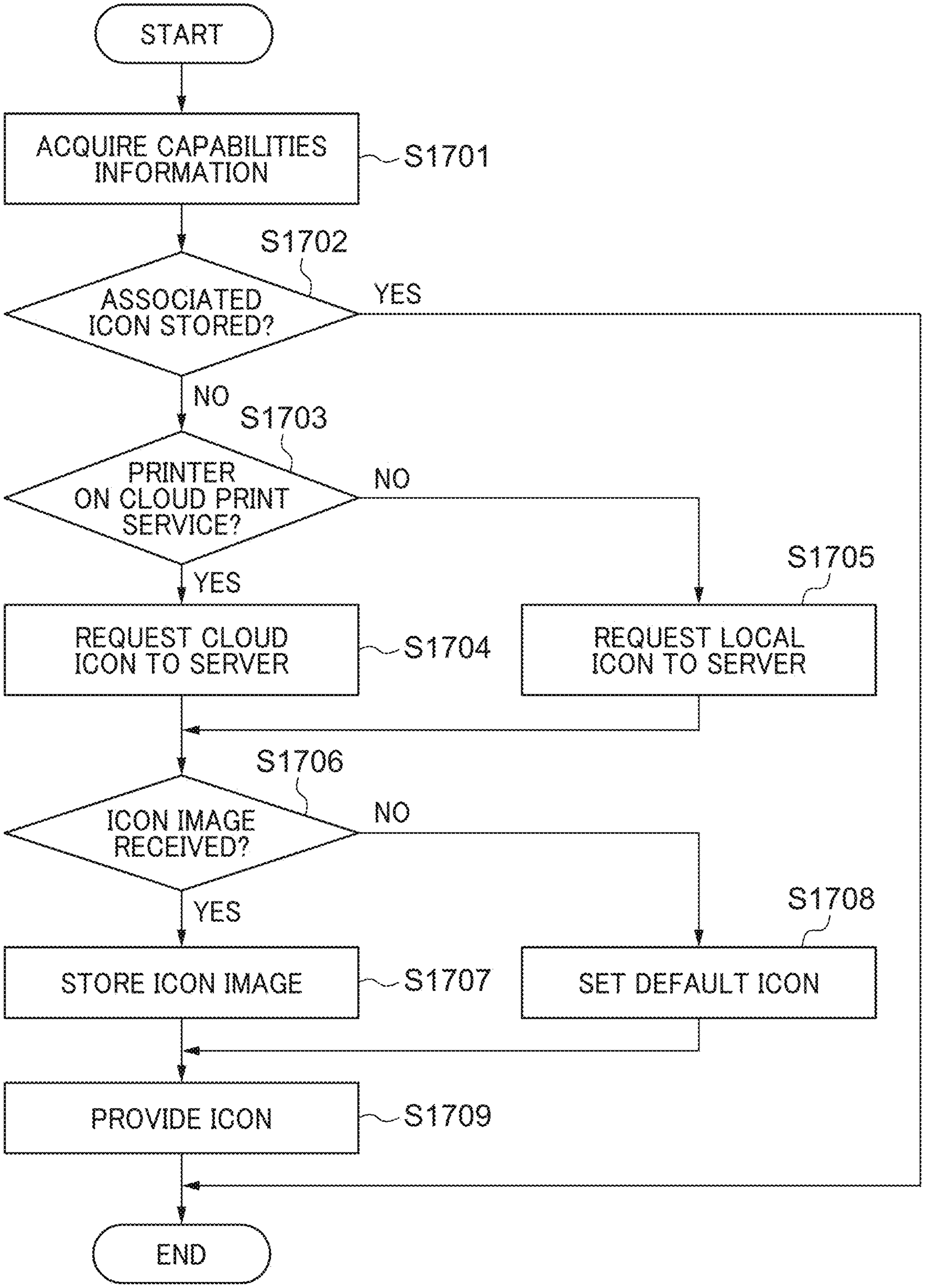
FIG. 17 is a flowchart of a process performed by a client computer according to the fourth embodiment.
Figure 18:
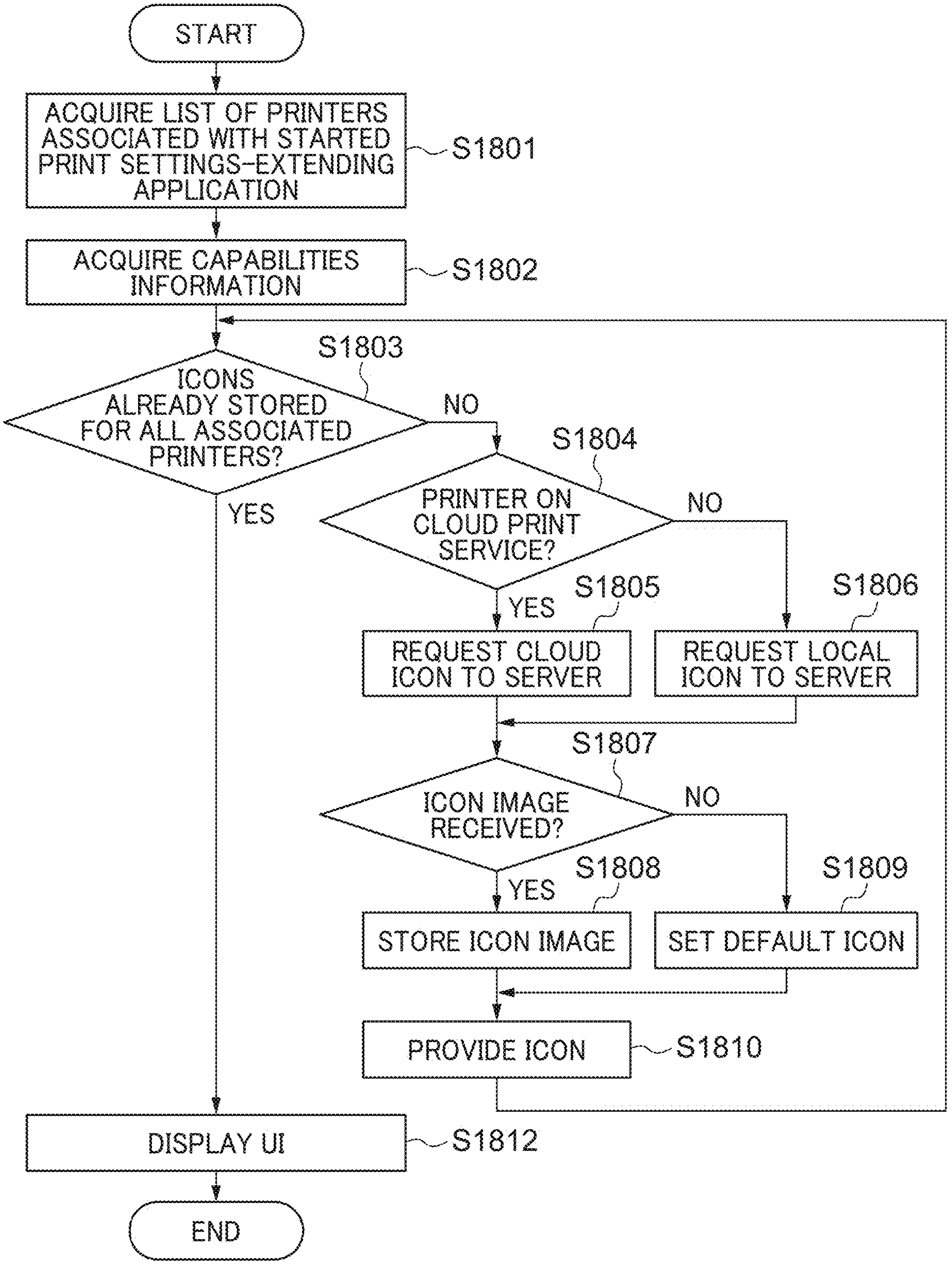
FIG. 18 is a flowchart of a variation of the process performed by the client computer.

The steps S1805 to S1810 are the same as the steps S1704 to S1709 of the flowchart in FIG. 17.

Figure 19A:
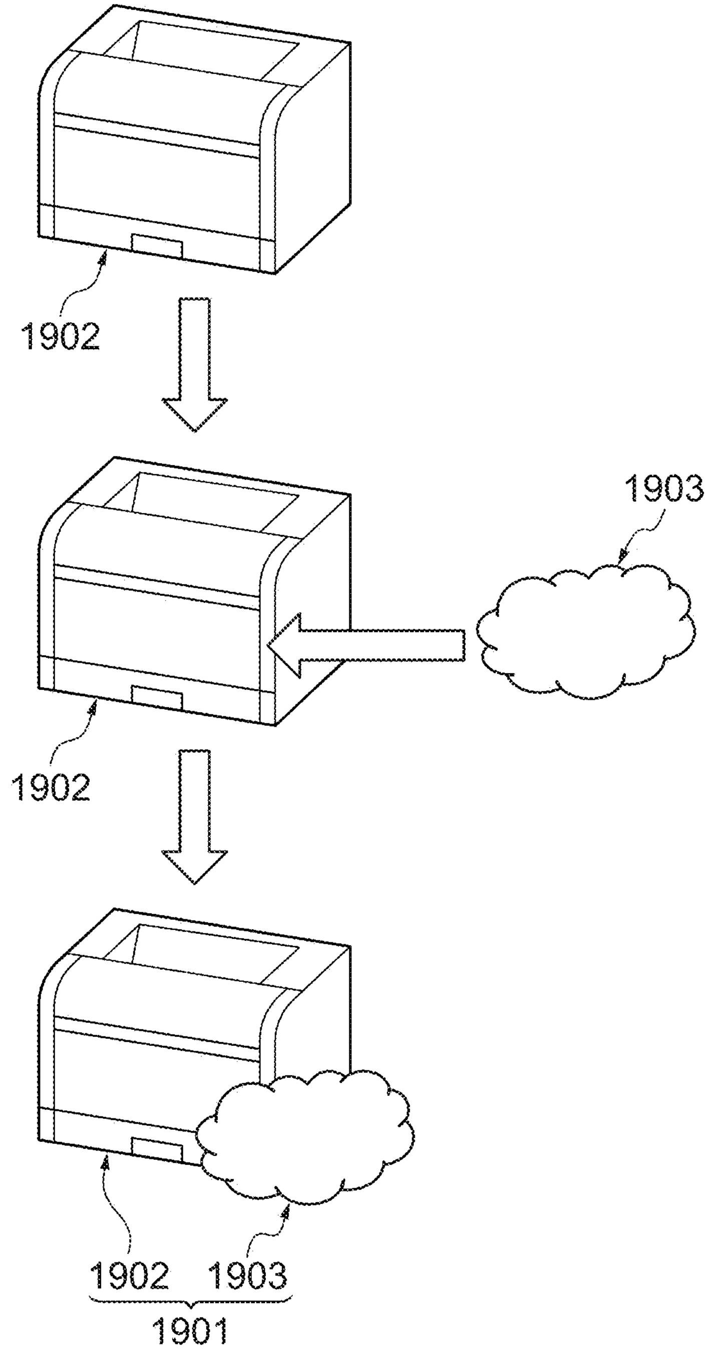
FIGS. 19A and 19B are diagrams each showing an example of an icon indicating a cloud print-supporting printer according to a fifth embodiment.
Figure 19B:
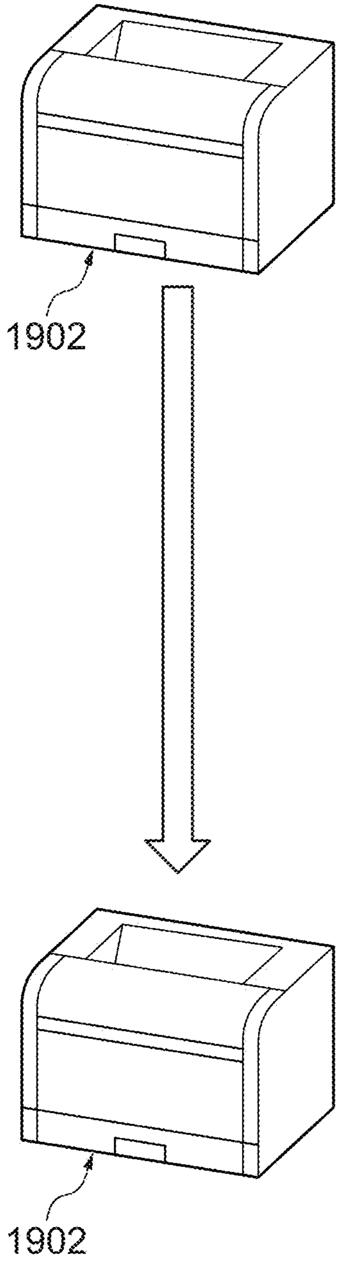

Hereafter, a fifth embodiment will be described with reference to FIGS. 19A and 19B, but the description will be given mainly of different points from the above-described first to fourth embodiments, and description of the same points is omitted. In the present embodiment, a configuration will be described applied to a case where an icon acquired from the cloud print service 500 and an icon acquired from the local printer are the same. FIGS. 19A and 19B are diagrams each showing an example of the icon indicating the cloud print-supporting printer according to the fifth embodiment. As shown in FIG. 19A, an icon 1902 which is formed to schematically resemble the appearance of the cloud print-supporting printer 200 is acquired from the cloud print service 500. As shown in FIG. 19B, the icon 1902 which is formed to schematically resemble the appearance of the cloud print-supporting printer 200 is also acquired from the cloud print-supporting printer 200, similarly to FIG. 19A. The icon 1902 shown in FIG. 19A and the icon 1902 shown in FIG. 19B are the same icon. In this case, the print setting-extending application 1052 generates an icon 1901 by adding a cloud 1903 formed to schematically resemble the appearance of a cloud to the icon 1902 shown in FIG. 19A. Then, the icon 1901 can be used as the cloud icon. On the other hand, the icon 1902 shown in FIG. 19B can be directly used as the local icon.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-110141 filed Jul. 4, 2023, which is hereby incorporated by reference herein in its entirety.

What is claimed is:

1. A printing apparatus that is capable of being in a first connection state in which the printing apparatus is communicably connected to an information processing apparatus via a server and a second connection state in which the printing apparatus is communicably connected to the information processing apparatus without using the server, comprising:

a storage unit configured to store a first icon indicating the printing apparatus in the first connection state and a second icon which is an icon indicating the printing apparatus in the second connection state and is different in visual recognition from the first icon; and a transmission unit configured to be capable of transmitting first information including the first icon to the server in a case where the printing apparatus is in the first connection state and transmitting second information including the second icon to the information processing apparatus in a case where the printing apparatus is in the second connection state.

2. The printing apparatus according to claim 1, wherein the transmission unit is inhibited from transmitting the second information in a case where the printing apparatus is in the first connection state, and inhibited from transmitting the first information in a case where the printing apparatus is in the second connection state.

3. The printing apparatus according to claim 1, further comprising an operation unit configured to perform a registration operation for registering the printing apparatus in the server, and an operation determination unit configured to determine whether or not the registration operation has been performed.

4. The printing apparatus according to claim 3, wherein the transmission unit can transmit the first information in a case where it is determined as a result of the determination performed by the operation determination unit that the registration operation has been performed, and transmit the second information in a case where it is determined as a result of the determination performed by the operation determination unit that the registration operation has not been performed.

5. The printing apparatus according to claim 4, further comprising a request determination unit configured to determine whether or not a request for output information has been received from the information processing apparatus in a case where it is determined as a result of the determination performed by the operation determination unit that the registration operation has not been performed, and wherein in a case where it is determined as a result of the determination performed by the request determination unit that the request for the output information has been received, the transmission unit transmits the second information, whereas in a case where it is determined as a result of the determination performed by the request determination unit that the request for the output information has not been received, the transmission unit does not transmit the second information.

6. The printing apparatus according to claim 1, wherein the first information includes output information associated with output conditions used in the printing apparatus, and wherein the transmission unit transmits the first icon and the output information at different times.

7. The printing apparatus according to claim 1, wherein the second information includes output information associated with output conditions used in the printing apparatus, and wherein the transmission unit collectively transmits the second icon and the output information.

8. The printing apparatus according to claim 1, wherein the first icon and the second icon are different in shape from each other.

9. The printing apparatus according to claim 1, wherein the first icon includes an appearance image formed to schematically resemble the appearance of the printing apparatus and a connection state image expressing that the printing apparatus is in the first connection state, and wherein the second icon includes the appearance image.

10. The printing apparatus according to claim 9, wherein the connection state image is a view formed to schematically resemble the appearance of a cloud.

11. The printing apparatus according to claim 1, further comprising a printing unit configured to perform printing on a recording medium using one of ink and toner as a printing material, and a remaining amount detection unit configured to detect a remaining amount of the printing material, and wherein the first information includes a remaining amount of the printing material at the time of transmission of the first information, and wherein the second information includes a remaining amount of the printing material at the time of transmission of the second information.

12. The printing apparatus according to claim 1, further comprising a status detection unit configured to detect a status of the printing apparatus, and wherein the first information includes status information of the printing apparatus at the time of transmission of the first information, and wherein the second information status includes information of the printing apparatus at the time of transmission of the second information.

13. The printing apparatus according to claim 1, further comprising a state determination unit configured to determine whether the printing apparatus is in the first connection state or in the second connection state.

14. The printing apparatus according to claim 9, wherein the printing apparatus is capable of acquiring the first information from the server and selecting the first icon included in the first information, as the information processing apparatus, and is communicably connected to an information processing apparatus that is capable of acquiring the second information from the information processing apparatus and selecting the second icon included in the second information.

15. A method of controlling a printing apparatus that is capable of being in a first connection state in which the printing apparatus is communicably connected to an information processing apparatus via a server and a second connection state in which the printing apparatus is communicably connected to the information processing apparatus without using the server, wherein the printing apparatus stores a first icon indicating the printing apparatus in the first connection state and a second icon which is an icon indicating the printing apparatus in the second connection state and is different in visual recognition from the first icon, the method comprising:

transmitting first information including the first icon to the server in a case where the printing apparatus is in the first connection state and transmitting second information including the second icon to the information processing apparatus in a case where the printing apparatus is in the second connection state.

16. A non-transitory computer-readable storage medium storing a program for causing a computer to execute a method of controlling a printing apparatus that is capable of being in a first connection state in which the printing apparatus is communicably connected to an information processing apparatus via a server and a second connection state in which the printing apparatus is communicably connected to the information processing apparatus without using the server, wherein the printing apparatus stores a first icon indicating the printing apparatus in the first connection state and a second icon which is an icon indicating the printing apparatus in the second connection state and is different in visual recognition from the first icon, wherein the method comprises:

transmitting first information including the first icon to the server in a case where the printing apparatus is in the first connection state and transmitting second information including the second icon to the information processing apparatus in a case where the printing apparatus is in the second connection state.

* * * * *